United States Patent
Yatabe et al.

(10) Patent No.: US 11,791,086 B2
(45) Date of Patent: Oct. 17, 2023

(54) ELECTRONIC COMPONENT

(71) Applicant: TAIYO YUDEN CO., LTD., Tokyo (JP)

(72) Inventors: Masuo Yatabe, Takasaki (JP); Chitose Kimura, Takasaki (JP); Kozue Imaizumi, Takasaki (JP); Ichiro Yokoyama, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 670 days.

(21) Appl. No.: 16/736,674

(22) Filed: Jan. 7, 2020

(65) Prior Publication Data

US 2020/0143977 A1    May 7, 2020

Related U.S. Application Data

(63) Continuation of application No. 15/719,419, filed on Sep. 28, 2017, now Pat. No. 10,566,129.

(30) Foreign Application Priority Data

Sep. 30, 2016 (JP) .................................. 2016-193271
Aug. 3, 2017 (JP) .................................. 2017-151115

(51) Int. Cl.
*H01F 17/04* (2006.01)
*H01F 27/28* (2006.01)
(Continued)

(52) U.S. Cl.
CPC ..... *H01F 27/2804* (2013.01); *H01F 17/0013* (2013.01); *H01F 27/292* (2013.01);
(Continued)

(58) Field of Classification Search
CPC ............. H01F 27/2804; H01F 17/0013; H01F 27/292; H01F 2027/2809; H01F 17/00;
(Continued)

(56) References Cited

U.S. PATENT DOCUMENTS 6,452,473 B1 * 9/2002 Suzuki ................ H01F 17/0013
336/200
7,692,527 B2 * 4/2010 Ito ........................ H01F 17/0013
336/200
(Continued)

FOREIGN PATENT DOCUMENTS

CN         1296628 A    5/2001
JP         H06124807 A  5/1994
(Continued)

OTHER PUBLICATIONS

A Notification of Examination Opinions with Search Report issued by Taiwan Intellectual Property Office, dated May 15, 2019, for Taiwan counterpart application No. 106132522, (8 pages).
(Continued)

*Primary Examiner* — Mang Tin Bik Lian
(74) *Attorney, Agent, or Firm* — Law Office of Katsuhiro Arai

(57) ABSTRACT

In an exemplary embodiment, an electronic component includes: an element body part 10 constituted by an insulative body of rectangular solid shape; an internal conductor 30 provided inside the element body part 10; and external electrodes 50 provided at least on the bottom face 14 (mounting surface) of the element body part 10 and electrically connected to the internal conductor 30; wherein the element body part 10 has: a conductor-containing layer 20 in which a coil conductor 36 (functional part) that will become a part of the internal conductor 30 to demonstrate electrical performance, is provided; and a high-hardness layer 22 which is provided side by side with the conductor-containing layer 20 in a direction parallel with the bottom face 14 (mounting surface) of the element body part 10, and which has a higher hardness compared to the conductor-containing (Continued)

layer 20. The electronic component has improve mechanical strength.

13 Claims, 24 Drawing Sheets

(51) Int. Cl.
    *H01F 17/00*     (2006.01)
    *H01G 4/40*     (2006.01)
    *H01G 4/30*     (2006.01)
    *H01G 4/012*     (2006.01)
    *H01F 27/29*     (2006.01)

(52) U.S. Cl.
    CPC .............. *H01G 4/012* (2013.01); *H01G 4/30* (2013.01); *H01G 4/40* (2013.01); *H01F 2027/2809* (2013.01)

(58) Field of Classification Search
    CPC ........... H01F 27/2847; H01F 2017/048; H01F 27/2809; H01G 4/012; H01G 4/30; H01G 4/40
    See application file for complete search history.

(56) References Cited

U.S. PATENT DOCUMENTS

| | | | | |
|---|---|---|---|---|
| 10,566,129 | B2* | 2/2020 | Yatabe | H01F 27/292 |
| 2003/0112116 | A1 | 6/2003 | Fujimoto et al. | |
| 2004/0113744 | A1 | 6/2004 | Watanabe et al. | |
| 2008/0038562 | A1 | 2/2008 | Ito et al. | |
| 2008/0290977 | A1* | 11/2008 | Ito | H01F 17/0013 336/184 |
| 2013/0015937 | A1* | 1/2013 | Seko | H01F 41/043 336/200 |
| 2013/0187744 | A1* | 7/2013 | Seko | H01F 17/0013 336/200 |
| 2014/0097927 | A1 | 4/2014 | Yamamoto et al. | |
| 2014/0145816 | A1* | 5/2014 | Sato | H01F 17/0013 336/208 |
| 2014/0292460 | A1 | 10/2014 | Kim et al. | |
| 2014/0306792 | A1* | 10/2014 | Yoneda | H01F 17/0013 336/200 |
| 2015/0287549 | A1* | 10/2015 | Park | H01G 4/005 361/270 |
| 2015/0325378 | A1* | 11/2015 | Park | H03H 7/01 333/185 |
| 2016/0268038 | A1* | 9/2016 | Choi | H01F 27/255 |
| 2017/0018351 | A1* | 1/2017 | Yatabe | H01F 27/2804 |
| 2017/0076851 | A1 | 3/2017 | Araki | |

FOREIGN PATENT DOCUMENTS

| | | |
|---|---|---|
| JP | H08148373 A | 6/1996 |
| JP | 2000173835 A | 6/2000 |
| JP | 2001345212 A | 12/2001 |
| JP | 2002305111 A * | 10/2002 |
| JP | 2009260106 A | 11/2009 |
| JP | 2010206089 A | 9/2010 |
| JP | 2013098356 A | 5/2013 |
| JP | 2013153009 A | 8/2013 |
| JP | 2013183009 A | 9/2013 |
| JP | 2014024735 A | 2/2014 |
| TW | 200809882 A | 2/2008 |
| TW | 201310474 A | 3/2013 |
| TW | 201324555 A | 6/2013 |
| WO | 0055873 A1 | 9/2000 |

OTHER PUBLICATIONS

A Notification of Examination Opinions with Search Report issued by Taiwan Intellectual Property Office, dated Oct. 15, 2018, for Taiwan counterpart application No. 106132522, (6pages).
A Notification of Reasons for Refusal issued by the Japanese Patent Office, dated Feb. 5, 2019, for Japanese counterpart application No. 2017-151115. (4 pages).
A Notification of Reasons for Refusal issued by the Japanese Patent Office, dated Jul. 30, 2019, for Japanese counterpart application No. 2017-151115. (7 pages).
Non-Final Office Action issued by U.S. Patent and Trademark Office, dated Apr. 1, 2019, for U.S. Appl. No. 15/719,419 (18 pages).
Notice of Allowance issued by U.S. Patent and Trademark Office, dated Oct. 17, 2019, for U.S. Appl. No. 15/719,419 (11 pages).

* cited by examiner

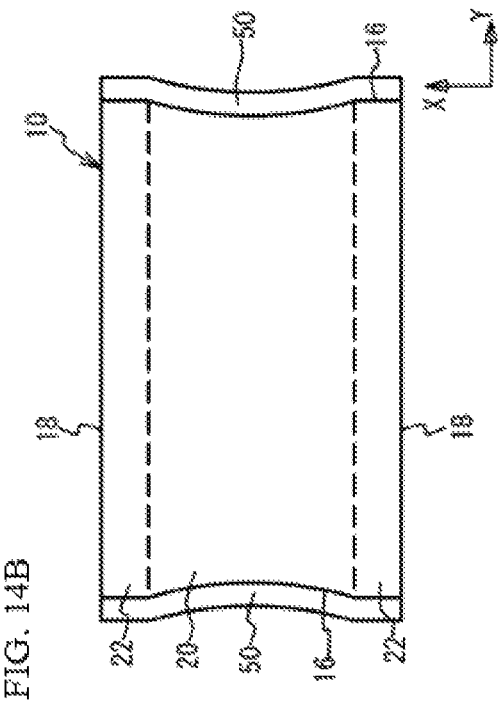
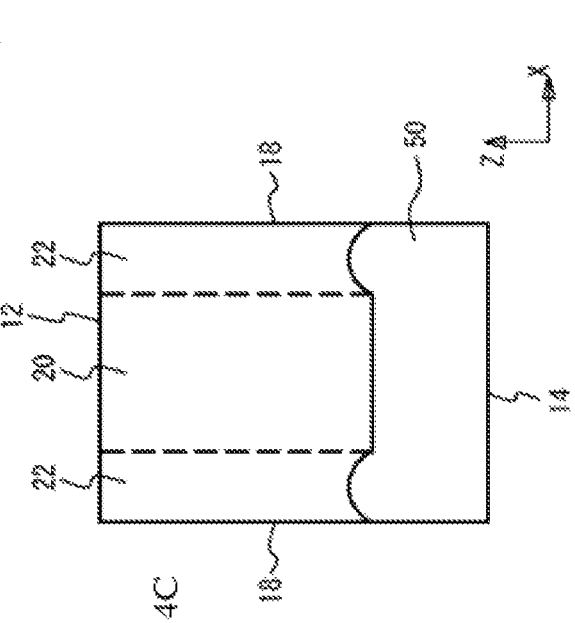
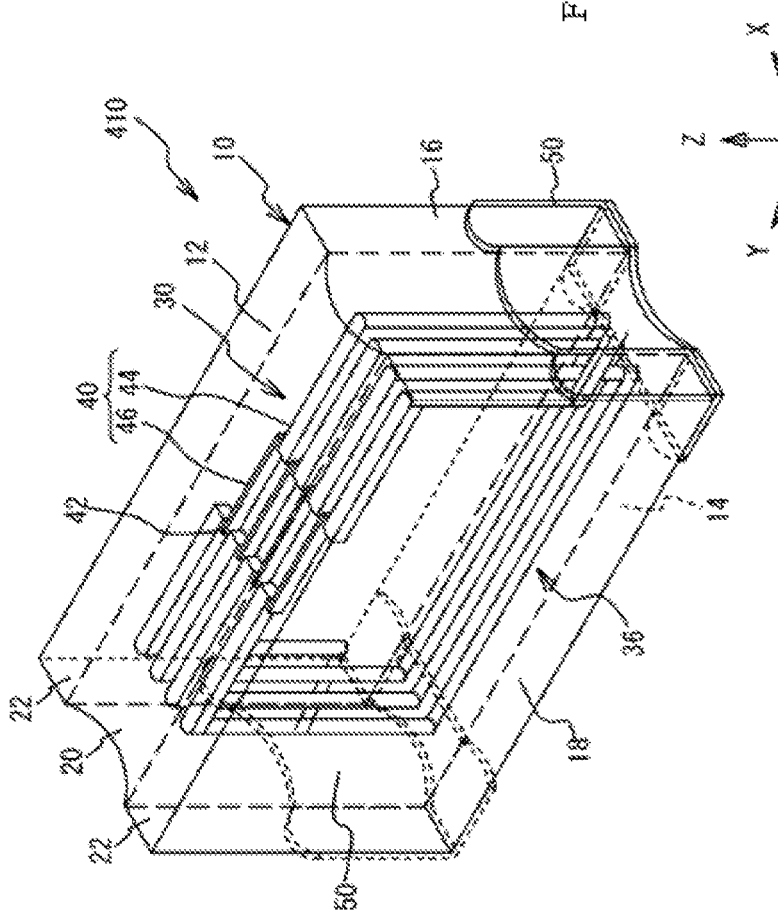
FIG. 14B
FIG. 14C
FIG. 14A

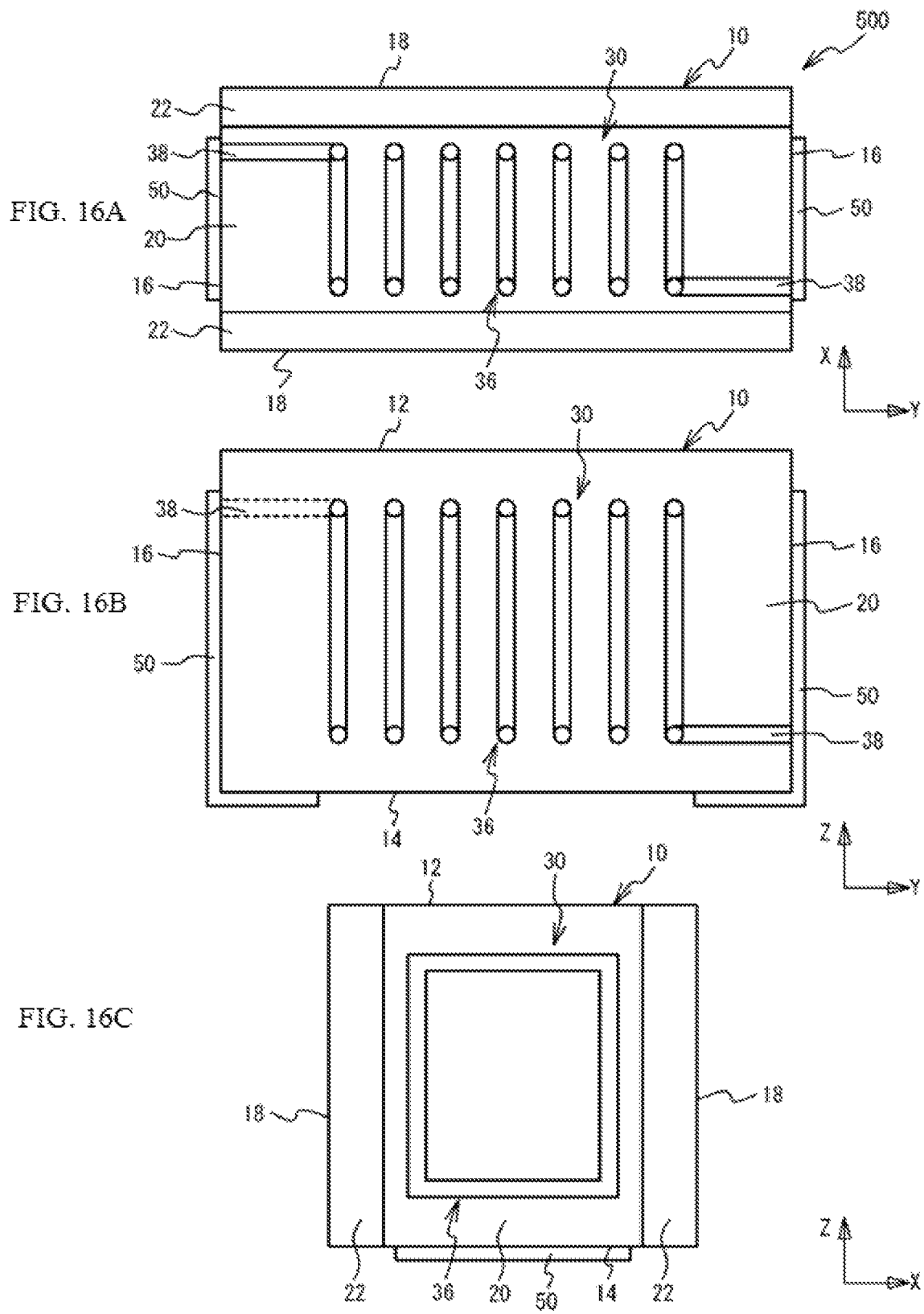

ELECTRONIC COMPONENT

CROSS-REFERENCE TO RELATED APPLICATIONS

This application is a continuation of U.S. patent application Ser. No. 15/719,419, filed Sep. 28, 2017, which claims priority to Japanese Patent Application No. 2016-193271, filed Sep. 30, 2016, and No. 2017-151115, filed Aug. 3, 2017, each disclosure of which is incorporated herein by reference in its entirety including any and all particular combinations of the features disclosed therein.

The applicant(s) herein explicitly rescind(s) and retract(s) any prior disclaimers or disavowals made in any parent, child or related prosecution history with regard to any subject matter supported by the present application.

BACKGROUND

Field of the Invention

The present invention relates to an electronic component.

Description of the Related Art

Electronic components whose internal conductor provided inside an insulative body of rectangular solid shape is electrically connected to external electrodes provided on the surface of the insulative body, are known. Electronic components used in high-frequency circuits are facing a demand for size reduction and improvement of high-frequency characteristics. For example, it is known that, with respect to an electronic component constituted by an insulative body and a coil conductor provided therein, the loss due to high-frequency resistance would decrease and therefore a higher Q-value would be obtained by orienting the coil axis in parallel with the mounting surface of the insulative body and also orthogonal to the opposing direction of the pair of external electrodes formed on the end faces of the insulative body (refer to Patent Literature 1, for example).

BACKGROUND ART LITERATURES

[Patent Literature 1] Japanese Patent Laid-open No. 2013-98356

SUMMARY

For example, in the case of an electronic component like the one described in Patent Literature 1, comprising an element body part constituted by an insulative body as well as a coil conductor provided therein, an insulating material of low dielectric constant may be used for the element body part in order to achieve a high Q-value. However, an insulating material of low dielectric constant would cause the mechanical strength of the element body part to drop and allow cracks, etc., to generate easily.

The present invention was developed in light of the aforementioned problems and its object is to improve the mechanical strength.

Any discussion of problems and solutions involved in the related art has been included in this disclosure solely for the purposes of providing a context for the present invention, and should not be taken as an admission that any or all of the discussion were known at the time the invention was made.

The present invention represents an electronic component comprising: an element body part constituted by an insulative body of rectangular solid shape; an internal conductor provided inside the element body part; and external electrodes provided at least on the mounting surface of the element body part and electrically connected to the internal conductor; wherein the element body part has: a conductor-containing layer in which a functional part, or part demonstrating electrical performance, of the internal conductor is provided; and a high-hardness layer which is provided side by side with the conductor-containing layer in a direction parallel with the mounting surface, and which has a higher hardness compared to the conductor-containing layer. In some embodiments, the conductor-containing layer and the high-hardness layer extend in the direction orthogonal to the mounting surface and are layered in the direction parallel with the mounting surface, i.e., in the X-axis or Y-axis direction as defined in this disclosure, and adhere to each other.

Under the aforementioned constitution, the high-hardness layer may be constituted in such a way that it contains, by a higher percentage than does the conductor-containing layer, a filler made of at least metal oxide or silicon oxide.

Under the aforementioned constitution, the element body part may be constituted in such a way that multiple high-hardness layers are provided, and the multiple high-hardness layers are provided in a manner sandwiching the conductor-containing layer.

Under the aforementioned constitution, the high-hardness layer may be constituted in such a way that it is provided side by side with the conductor-containing layer in a direction parallel with the mounting surface of the element body part and also with the end faces adjoining the mounting surface of the element body part.

Under the aforementioned constitution, the conductor-containing layer may be constituted in such a way that it is recessed with respect to the high-hardness layer on the end faces, while the external electrodes may be constituted in such a way that they extend from the mounting surface, to the end faces, of the element body part and that they are provided at least on the conductor-containing layer on the end faces.

Under the aforementioned constitution, the external electrodes may be constituted in such a way that they are provided only on the conductor-containing layer, among the conductor-containing layer and high-hardness layer, on the end faces.

Under the aforementioned constitution, the conductor-containing layer may be constituted in such a way that it is thicker than the high-hardness layer in the direction in which the conductor-containing layer and high-hardness layer are provided side by side.

Under the aforementioned constitution, the internal conductor may be constituted in such a way that it has a coil conductor as the functional part.

Under the aforementioned constitution, the coil conductor may be constituted in such a way that it is provided only in the conductor-containing layer, among the conductor-containing layer and high-hardness layer.

Under the aforementioned constitution, the conductor-containing layer may be constituted in such a way that its dielectric constant is lower than that of the high-hardness layer.

Under the aforementioned constitution, the conductor-containing layer and high-hardness layer may each be constituted by a material containing glass or resin, and they may also be constituted in such a way that the content by percentage of the silicon component in the material constituting the conductor-containing layer is higher than the content by percentage of the silicon component in the material constituting the high-hardness layer.

Under the aforementioned constitution, the coil conductor may be constituted in such a way that it has a coil axis running roughly in parallel with the mounting surface.

Under the aforementioned constitution, the functional part may be constituted in such a way that it is electrically connected to the external electrodes, via lead conductors, at the mounting surface, or at the end faces adjoining the mounting surface, of the element body part.

Under the aforementioned constitution, a marker part may be provided on the element body part.

According to the present invention, the mechanical strength can be improved.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 14A is an oblique perspective view, FIG. 14B is a view from the top-face side of the element body part, and FIG. 14C is a view from the end-face side of the element body part, of the electronic component pertaining to Variation Example 1 of Example 4.

FIG. 16A is a top cross-sectional view, FIG. 16B is a side cross-sectional view, and FIG. 16C is an end cross-sectional view, of the electronic component pertaining to Example 5.

FIG. 21A is an oblique perspective view of the electronic component pertaining to Example 8, while

FIG. 24A is an oblique perspective view of the electronic component pertaining to Variation Example 1 of Example 9, while

DESCRIPTION OF THE SYMBOLS

Figure 1:
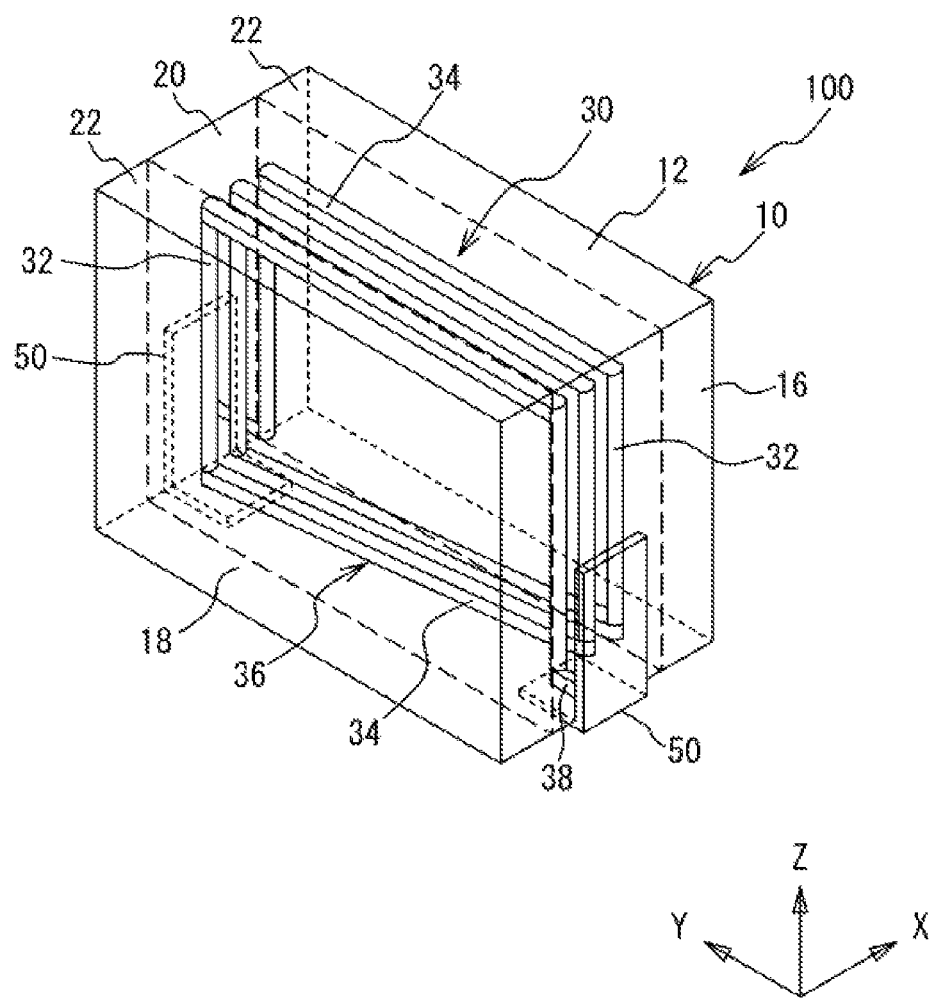
FIG. 1 is an oblique perspective view of the electronic component pertaining to Example 1.

10 Element body part
12 Top face
14 Bottom face
16 End face
18 Side face (a lateral side of a high-hardness layer)
20 Conductor-containing layer
22 High-hardness layer
30 Internal conductor
32 First conductor
34 Second conductor
36 Coil conductor
38 Lead conductor
40 Conductor pattern
42 Via hole conductor
44 C-shaped pattern
46 I-shaped pattern
50 External electrode
60 Flat electrode
62 Capacitor part
80 Marker part
G1 to G16 Green sheet
100 to 1000 Electronic component

DETAILED DESCRIPTION OF EMBODIMENTS

Examples of the present invention are explained below by referring to the drawings.

Example 1

Figure 2A:
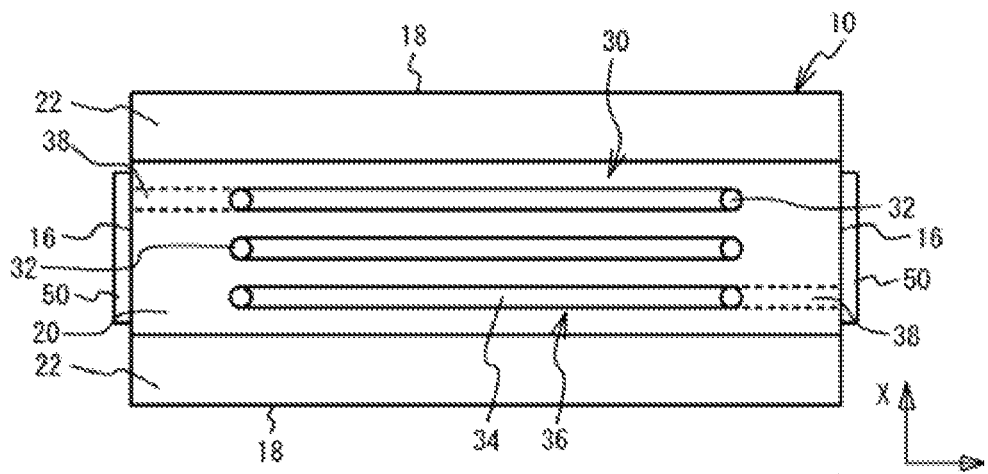
FIG. 2A is a top cross-sectional view.
Figure 2B:
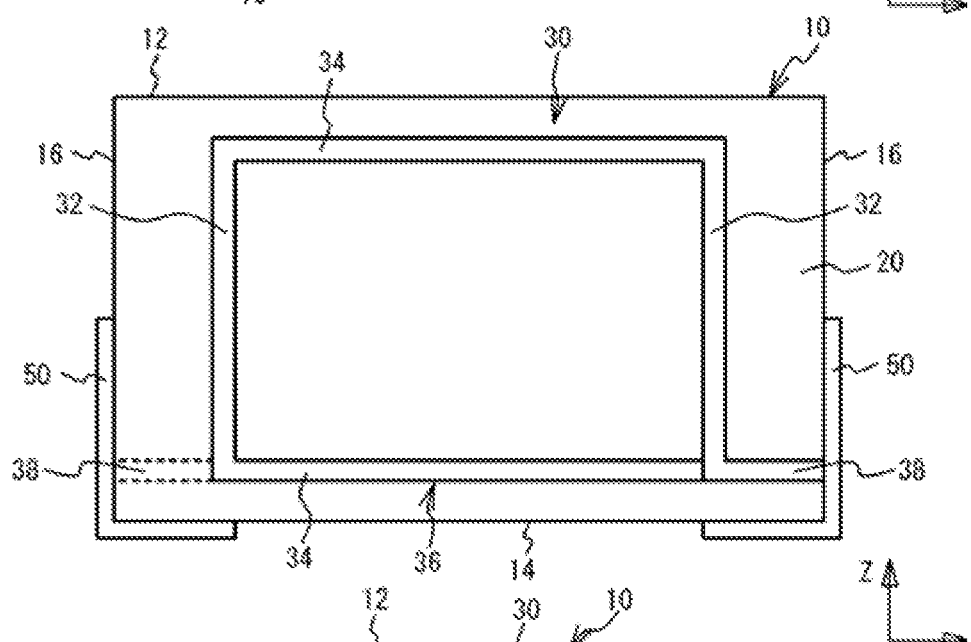
FIG. 2B is a side cross-sectional view.
Figure 2C:
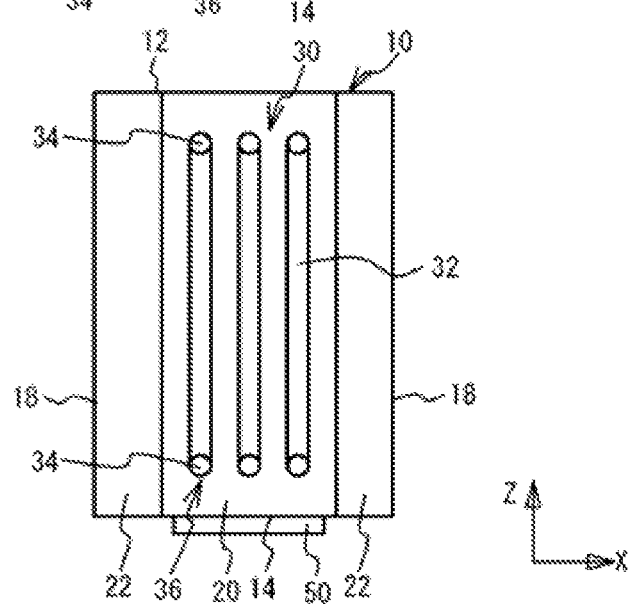
FIG. 2C is an end cross-sectional view, of the electronic component pertaining to Example 1.

FIG. 1 is an oblique perspective view of the electronic component pertaining to Example 1. FIG. 2A is a top cross-sectional view, FIG. 2B is a side cross-sectional view, and FIG. 2C is an end cross-sectional view, of the electronic component pertaining to Example 1. As shown in FIG. 1 to FIG. 2C, the electronic component 100 in Example 1 comprises an element body part 10 constituted by an insulative body, an internal conductor 30, and external electrodes 50.

The element body part 10 has a top face 12 corresponding to a second face, a bottom face 14 corresponding to a first face, a pair of end faces 16, and a pair of side faces 18, and constitutes a rectangular solid shape having a width-direction side in the X-axis direction, a length-direction side in the Y-axis direction and a height-direction side in the Z-axis direction. The bottom face 14 represents a mounting surface, while the top face 12 is opposing the bottom face 14. The end faces 16 are each connected to a pair of sides (such as short sides) of the top face 12 and bottom face 14, while the side faces 18 are each connected to a pair of sides (such as long sides) of the top face 12 and bottom face 14. The element body part 10 has a width dimension of 0.05 mm to 0.3 mm, a length dimension of 0.1 mm to 0.6 mm, and a height dimension of 0.05 mm to 0.5 mm, for example. Even when the height dimension is set smaller than the length dimension and width dimension, for example, the mechanical strength of the component can still be enhanced. It should be noted that the element body part 10 is not limited to a perfect rectangular solid shape; instead, it may have a roughly rectangular solid shape whose apexes are each rounded, whose ridges (boundaries of faces) are each rounded, or whose surfaces are each curved, or the like, for example. In other words, the term "rectangular solid shape" includes roughly rectangular solid shapes as described above. It should be noted that each apex may be rounded to a radius of curvature R corresponding to less than 20% of the length of the short side of the element body part 10. As for the roundness of the ridge formed by the bottom face 14 and the end face 16, the roundness of the high-hardness layer 22 part may be smaller than the roundness of the conductor-containing layer 20 part. This way, the component will have a more stable posture when mounted. Each surface may be smoothed to a surface irregularity of 30 μm or less per plane, from the viewpoint of ensuring stability when the component is mounted on a mounting board.

The internal conductor 30 is provided inside the element body part 10. The element body part 10 has a conductor-containing layer 20 in which at least a functional part, or part demonstrating electrical performance, of the internal conductor 30 is provided, as well as high-hardness layers 22 in which no functional part of the internal conductor 30 is provided. The conductor-containing layer 20 and high-hardness layers 22 are provided side by side in the X-axis direction (width direction). The high-hardness layers 22 are provided in a manner sandwiching the conductor-containing layer 20 from both sides in the X-axis direction (width direction), to constitute the side faces 18. In the X-axis direction, the conductor-containing layer 20 is thicker than the high-hardness layer 22.

Here, the mechanical strength of the element body part 10 is primarily due to the high-hardness layers 22. Accordingly, with an understanding that sufficient mechanical strength can be ensured by making the high-hardness layer 22 higher (longer in the Z-axis direction), each dimension of the high-hardness layer 22 is determined according to the material used. Also, each dimension of the high-hardness layer 22 takes into consideration the length (length in the Y-axis direction) and width (length in the X-axis direction) of the electronic component. As an example, if the length of the electronic component is greater than its width and the conductor-containing layer 20 and high-hardness layers 22 are provided side by side in the width direction (X-axis direction) of the element body part 10, then preferably the height of the high-hardness layer 22 is greater than its width. In other words, sufficient mechanical strength can be ensured by the height of the high-hardness layers 22 and thus they can be made narrower, which in turn allows for an increase in the ratio of the conductor-containing layer 20 that houses the functional part of the internal conductor 30.

For example, the thickness of the conductor-containing layer 20 in the X-axis direction is 0.17 mm, while the total thickness of the high-hardness layers 22 is 0.03 mm. As for the length and height of the high-hardness layer 22 in the Y-axis direction and Z-axis direction, respectively, the smaller the ratio of the length to the height, the better. When this ratio is 1:2 or less, the aforementioned thickness ratio of the conductor-containing layer 20 and the high-hardness layer 22 can be achieved.

As for the length and height to which the conductor-containing layer 20 is formed in the Y-axis direction and Z-axis direction, respectively, they may be equal to or slightly smaller than the length and height of the high-hardness layer 22. This way, the conductor-containing layer 20 is protected by the high-hardness layers 22. By setting the length and height of the conductor-containing layer 20 with a difference of 0 μm to −60 μm from the length and height of the high-hardness layer 22, respectively, any impact on the nozzle pickup and ease of mounting, when the component is mounted on a mounting board, can be minimized.

The conductor-containing layer 20 and high-hardness layer 22 are each formed by an insulating material whose primary component is a resin, for example. For this resin, any resin that can be cured by heat, light, chemical reaction, etc., is used, where examples include polyimide, epoxy resin, and liquid crystal polymer, or the like. Also, the conductor-containing layer 20 and high-hardness layer 22 may each be formed by an insulating material whose primary component is glass, or it may be formed by a ferrite, dielectric ceramic, magnetic body using soft magnetic alloy material, or resin mixed with magnetic powder.

When the conductor-containing layer 20 is formed by resin, glass, etc., the color of the high-hardness layer 22 may be made darker than that of the conductor-containing layer 20, or the transparency of the conductor-containing layer 20 may be made higher than that of the high-hardness layer 22, or their insulating materials may be made visibly different. This way, the orientation of the electronic component can be identified by identifying each color based on image, by identifying each insulating material based on transparency, by identifying the orientation of the internal conductor based on transmission of light, or the like. Because of this, aligning operations in the production process becomes easier and fewer problems occur when the components are mounted on mounting boards.

The high-hardness layer 22 has a higher hardness compared to the conductor-containing layer 20. The "hardness" is resistance of the material constituting each layer to indentation under a static load or to scratching. For example, the Vickers hardness and Knoop hardness (or equivalent thereto), both of which can be measured in a very small area, of the high-hardness layer 22 are higher than those of the conductor-containing layer 20. As an example, the Vickers hardness of the high-hardness layer 22 is 650 N/mm$^2$, while the Vickers hardness of the conductor-containing layer 20 is 400 N/mm$^2$. Since the hardness is correlated to the strength, the fact that the high-hardness layer 22 has a higher hardness compared to the conductor-containing layer 20 means that the high-hardness layer 22 has higher strength (mechanical strength) compared to the conductor-containing layer 20.

The conductor-containing layer 20 and high-hardness layer 22 may both be formed by the same insulating material, or they may each be formed by a different insulating material, so long as the hardness of the high-hardness layer 22 is higher than that of the conductor-containing layer 20. For example, the high-hardness layer 22 has a higher hardness compared to the conductor-containing layer 20 because it contains, by a higher percentage (such as percent by volume) than the conductor-containing layer 20 does, a filler made of at least metal oxide or silicon oxide ($SiO_2$). Here, the term "filler" refers to a strength substance that has been added to the insulating material in the form of grains. The added filler is present as grains inside the non-crystalline part of the glass, resin, etc., and its presence can be observed based on SEM (scanning electron microscope) analysis or TEM (transmission electron microscope) analysis. By observing the two layers at the same magnification and calculating the area percentage of filler grains in each layer on the observed image, the filler contents in the two layers can be compared. Metal oxides that contribute to higher hardness include, for example, aluminum oxide ($Al_2O_3$), zirconium oxide ($ZrO_2$), strontium oxide (SrO), titanium oxide ($TiO_2$), and the like. It should be noted that the conductor-containing layer 20 may or may not contain a filler made of at least a metal oxide or $SiO_2$.

The conductor-containing layer 20 and high-hardness layer 22 can each use a material whose primary component is the same or different. If they each use a material whose primary component is different, the conductor-containing layer 20 and high-hardness layer 22 are put through a sintering process that has been adjusted to prevent the materials from affecting each other, or they are bonded and laminated after sintering, or otherwise treated, to form the element body part 10. If materials whose primary component is the same are used for the conductor-containing layer 20 and high-hardness layer 22, respectively, on the other hand, adhesion of the conductor-containing layer 20 and high-hardness layer 22 at their interface can be ensured easily and the difference between the linear expansion coefficients of the two can be reduced. This way, sufficient strength can be ensured, and reliability based on heat cycle test, etc., can also be ensured, for the element body part 10 as a whole. Additionally, when the external electrode 50 is formed over the conductor-containing layer 20 and high-hardness layer 22, the external electrode 50 can be evaluated with respect to the conductor-containing layer 20 and also with respect to the high-hardness layer 22, in one evaluation, which not only makes it easy to select the external electrode 50, but also naturally facilitates ensuring adhesion. Similar effects are also achieved in terms of reliability, in particular.

The conductor-containing layer 20 has a lower dielectric constant compared to the high-hardness layer 22. For example, the conductor-containing layer 20 has a lower dielectric constant compared to the high-hardness layer 22 because the content by percentage (such as percent by weight) of the silicon (Si) component (that is, not Si in SiO2, etc., used for the filler) in the material constituting the conductor-containing layer 20 is higher than the content by percentage (such as percent by weight) of the Si component in the material constituting the high-hardness layer 22. For example, the content by percentage of the Si component in the glass, resin, etc., constituting the conductor-containing layer 20 is higher than the content by percentage of the Si component in the glass, resin, etc., constituting the high-hardness layer 22.

The internal conductor 30 has multiple first conductors 32 and multiple second conductors 34, and as these multiple first conductors 32 and multiple second conductors 34 are connected together, a coil conductor 36 is formed. In other words, the coil conductor 36 is constituted as a spiral shape that includes the multiple first conductors 32 and multiple second conductors 34, and it has specified winding units and a coil axis crossing roughly at right angles with the surfaces specified by the winding units. The coil conductor 36 represents a functional part, which demonstrates electrical performance, of the internal conductor 30.

The multiple first conductors 32 are divided into two conductor groups that are opposing each other roughly in the Y-axis direction. The first conductors 32 constituting each of the two conductor groups extend along the Z-axis direction and are placed at prescribed intervals in the X-axis direction. The multiple second conductors 34 are formed in parallel with the XY plane, and divided into two conductor groups that are opposing each other in the Z-axis direction. The second conductors 34 constituting each of the two conductor groups, extend along the Y-axis direction, are placed at prescribed intervals in the X-axis direction, and interconnect the first conductors 32 individually. This way, a coil conductor 36 which has a coil axis running in the X-axis direction and its opening has a rectangular shape, is formed inside the element body part 10. In other words, the coil conductor 36 has a coil axis running in a direction roughly parallel with the bottom face 14 of the element body part 10, and is wound vertically. It should be noted that the term "roughly parallel with" also includes "a direction slightly or insubstantially inclined with respect to the X-axis direction."

The external electrode 50 is an external terminal used for surface mounting, and two external electrodes are provided in a manner opposing each other in the Y-axis direction. The external electrodes 50 are provided in a manner extending from the bottom face 14, to the end faces 16, of the element body part 10, and covering parts of the bottom face 14 and parts of the end faces 16. In other words, the external electrodes 50 each have an L-shape. The external electrodes 50 are formed only on the surface of the conductor-containing layer 20, and not on the surface of the high-hardness layer 22, for example. Also, the external electrodes 50 may be formed across the surface of the conductor-containing layer 20 and the surface of the high-hardness layer 22, for example.

The internal conductor 30 further has lead conductors 38 as non-functional parts, in addition to the coil conductor 36 which is a functional part constituted by the multiple first conductors 32 and multiple second conductors 34. The lead conductors 38 are placed on the same XY plane shared by the second conductors 34 positioned on the bottom-face 14 side of the element body part 10, and provided in parallel with the Y-axis direction. The coil conductor 36 is electrically connected, via the lead conductor 38, to the external electrodes 50 at the bottom face 14 (mounting surface), or at the end faces 16, of the element body part 10.

The internal conductor 30 is formed by copper (Cu), aluminum (Al), nickel (Ni), silver (Ag), platinum (Pt), palladium (Pd), or other metal material, or alloy metal material containing any of the foregoing, for example. The external electrode 50 is formed by silver (Ag), copper (Cu), aluminum (Al), nickel (Ni), or other metal material, or a multilayer film constituted by silver (Ag), copper (Cu), or aluminum (Al), with nickel (Ni) plating and tin (Sn) plating, or a multilayer film constituted by nickel (Ni) with tin (Sn) plating.

Next, how the electronic component 100 in Example 1 is manufactured, is explained. In the case of the electronic component 100 in Example 1, multiple wafers are produced simultaneously and then separated into individual elements. Also, the electronic component 100 in Example 1 is formed layer by layer from the top-face 12 side of the element body part 10.

Figure 3A:
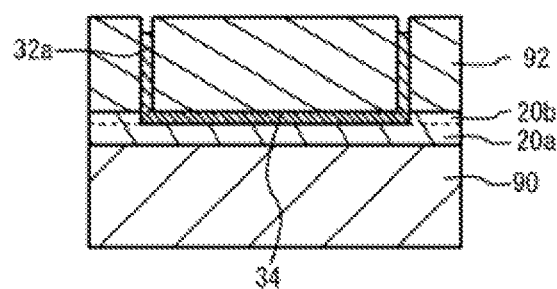
FIG. 3A to FIG. 3F are cross-sectional views showing how the electronic component pertaining to Example 1 is manufactured (1).
Figure 3D:
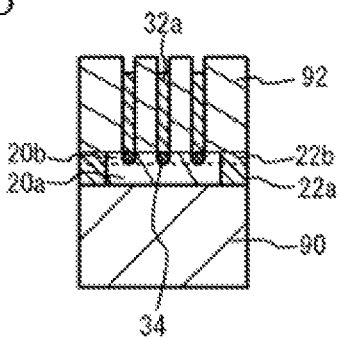

FIG. 3A to FIG. 4D are cross-sectional views showing how the electronic component pertaining to Example 1 is manufactured. FIG. 3A to FIG. 3C, FIG. 4A and FIG. 4B are drawings corresponding to side cross-sectional views, while FIG. 3D to FIG. 3F, FIG. 4C and FIG. 4D are drawings corresponding to end cross-sectional views, of the electronic component in Example 1. As shown in FIG. 3A and FIG. 3D, a resin material is printed or applied, or a resin film is bonded, for example, on a silicon substrate, glass substrate, sapphire substrate, or other support substrate 90, for example, to form a first layer 20a of conductor-containing layer 20, and a first layer 22a of high-hardness layer 22 in a manner sandwiching and in contact with the first layer 20a. On the first layer 20a of conductor-containing layer 20, second conductors 34 of internal conductor 30 are formed according to the sputtering method, while a second layer 20b of conductor-containing layer 20 is also formed in a manner covering the second conductors 34. On the first layer 22a of high-hardness layer 22, a second layer 22b of high-hardness layer 22 is formed in a manner sandwiching and in contact with the second layer 20b of conductor-containing layer 20. The second layer 20b of conductor-containing layer 20, and the second layer 22b of high-hardness layer 22, are each formed by printing or applying a resin material or bonding a resin film. Thereafter, the second layer 20b of conductor-containing layer 20, and the second layer 22b of high-hardness layer 22, are polished, to expose the top faces of the second conductors 34.

Next, a seed layer (not illustrated) is formed on the second layer 20b of conductor-containing layer 20, and on the second layer 22b of high-hardness layer 22, after which a resist film 92 with openings is formed on the seed layer. After the resist film 92 has been formed, a descum process may be performed to remove the remaining resist in the openings. Thereafter, top parts 32a of first conductors 32 are formed inside the openings in the resist film 92 according to the electroplating method.

Figure 3B:
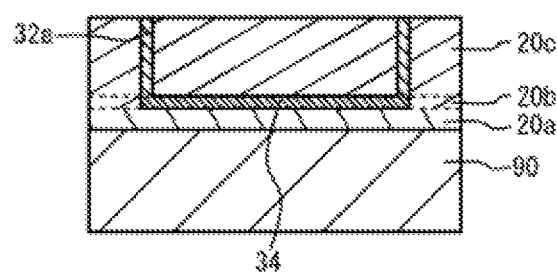
Figure 3E:
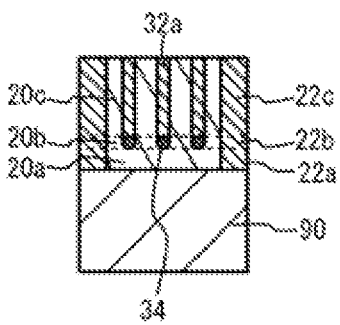

As shown in FIG. 3B and FIG. 3E, the resist film 92 and seed layer are removed, after which a third layer 20c of conductor-containing layer 20 is formed in a manner covering the top parts 32a of first conductors 32, and a third layer 22c of high-hardness layer 22 is formed in a manner sandwiching and in contact with the third layer 20c. The third layer 20c of conductor-containing layer 20, and the third layer 22c of high-hardness layer 22, are each formed by printing or applying a resin material or bonding a resin film. Thereafter, the third layer 20c of conductor-containing layer 20, and the third layer 22c of high-hardness layer 22, are polished to expose the surfaces of the top parts 32a of first conductors 32.

Figure 3C:
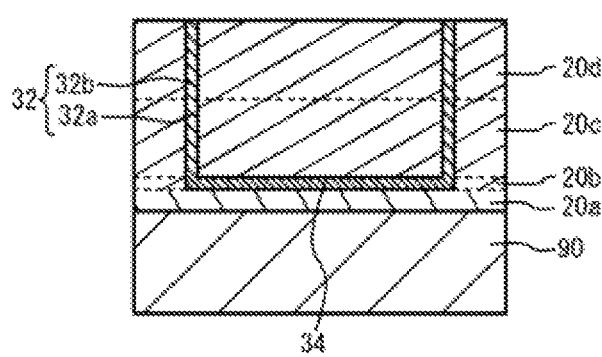
Figure 3F:
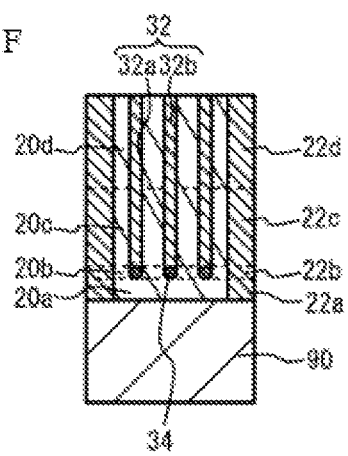

As shown in FIG. 3C and FIG. 3F, bottom parts 32b of first conductors 32 are formed, and a fourth layer 20d of conductor-containing layer 20 is formed in a manner covering the bottom parts 32b of first conductors 32, on the third layer 20c of conductor-containing layer 20. On the third layer 22c of high-hardness layer 22, a fourth layer 22d of high-hardness layer 22 is formed in a manner sandwiching and in contact with the fourth layer 20d of conductor-containing layer 20. The bottom parts 32b of first conductors 32 are formed in a manner connecting to the top parts 32a of first conductors 32. The bottom parts 32b of first conductors 32, the fourth layer 20d of conductor-containing layer 20, and the fourth layer 22d of high-hardness layer 22, may be formed according to methods similar to how the top parts 32a of first conductors 32, the third layer 20c of conductor-containing layer 20, and the third layer 22c of high-hardness layer 22, are formed.

Figure 4A:
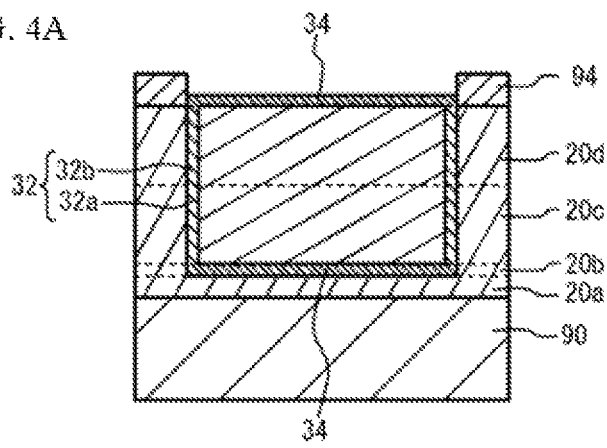
FIG. 4A to FIG. 4D are cross-sectional views showing how the electronic component pertaining to Example 1 is manufactured (2).
Figure 4B:
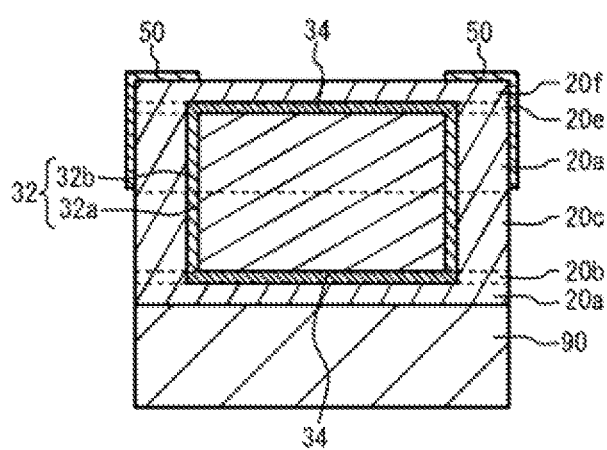
Figure 4C:
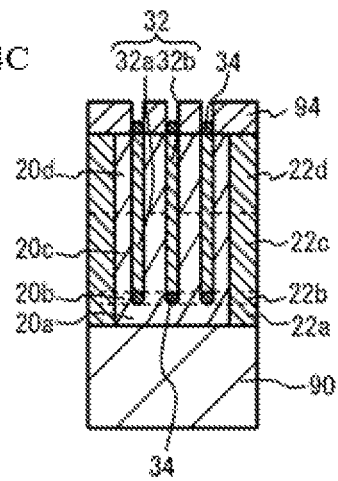

As shown in FIG. 4A and FIG. 4C, a seed layer (not illustrated), and a resist film 94 with openings, are formed on the fourth layer 20d of conductor-containing layer 20 and on the fourth layer 22d of high-hardness layer 22, and then second conductors 34 and lead conductors 38 (not illustrated) are formed inside the openings in the resist film 94 according to the electroplating method.

Figure 4D:
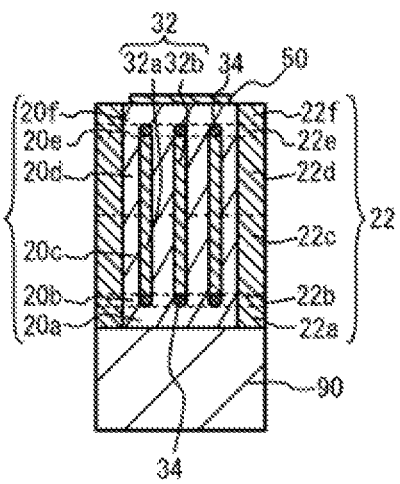

As shown in FIG. 4B and FIG. 4D, the resist film 94 and seed layer are removed, after which a fifth layer 20e of conductor-containing layer 20 is formed in a manner covering the second conductors 34 and lead conductors 38, and a fifth layer 22e of high-hardness layer 22 is formed in a manner sandwiching and in contact with the fifth layer 20e. Thereafter, a sixth layer 20f of conductor-containing layer 20, and a sixth layer 22f of high-hardness layer 22, are formed on the fifth layer 20e of conductor-containing layer 20 and on the fifth layer 22e of high-hardness layer 22. The conductor-containing layer 20 is constituted by the first layer 20a to the sixth layer 20f. The high-hardness layer 22 is constituted by the first layer 22a to the sixth layer 22f. Thereafter, external electrodes 50 are formed on the surface of the element body part 10. The electronic component 100 in Example 1 has thus been formed.

Figure 5:
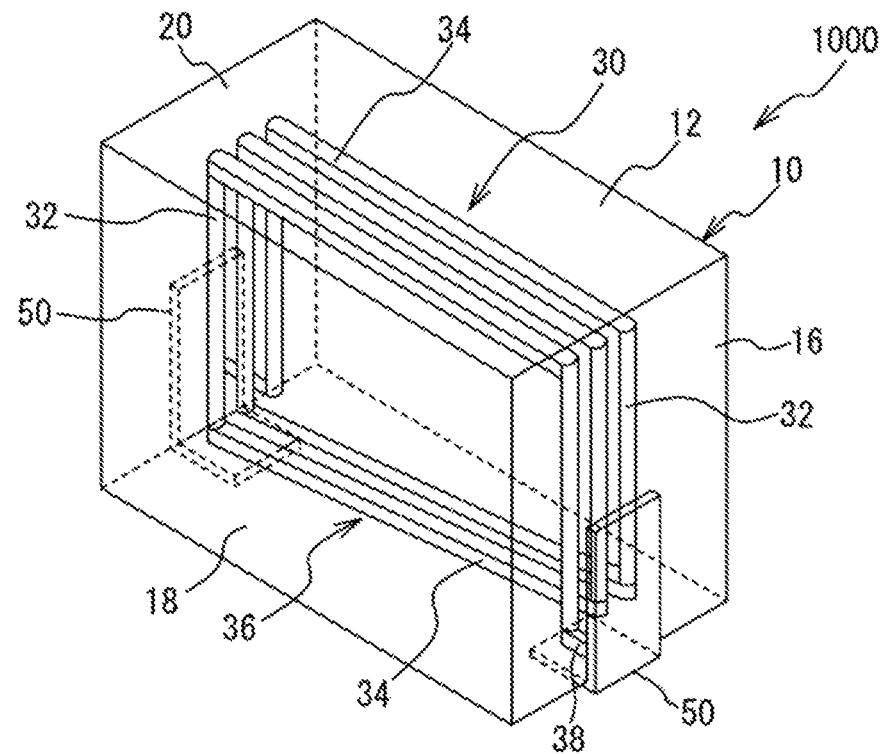
FIG. 5 is an oblique perspective view of the electronic component pertaining to Comparative Example 1.

FIG. 5 is an oblique perspective view of the electronic component pertaining to Comparative Example 1. As shown in FIG. 5, an electronic component 1000 in Comparative Example 1 is such that the element body part 10 has no high-hardness layer 22 and has a conductor-containing layer 20 in areas corresponding to where the high-hardness layer 22 was provided in Example 1. Other constitutions are the same as in Example 1 and therefore not explained.

The inventor conducted a deflection test on the electronic components in Example 1 and Comparative Example 1. The deflection test involved mounting each electronic component on the top face of a mounting board, applying pressure to the mounting board from its bottom face to deflect the mounting board, and checking whether or not the electronic component would generate cracks. The electronic components on which the deflection test was conducted had a size of 0.2 mm in width, 0.4 mm in length, and 0.2 mm in height, for both Example 1 and Comparative Example 1. Also, in Example 1, a high-hardness layer 22 of 0.015 mm in thickness and 650 N/mm$^2$ in Vickers hardness was provided on both sides of a conductor-containing layer 20 of 0.17 mm in thickness and 400 N/mm$^2$ in Vickers hardness.

Table 1 shows the deflection test results. As shown in Table 1, none of the 10 chips tested under Example 1 generated cracks, while three of the 10 chips according to Comparative Example 1 generated cracks, when the deflection amount of the mounting board was adjusted to 2 mm. When the deflection amount of the mounting board was adjusted to 4 mm, none of the 10 chips according to Example 1 generated cracks, while all of the 10 chips according to Comparative Example 1 generated cracks. These results show that generation of cracks was suppressed under Example 1 but not under Comparative Example 1. This is probably because, in Example 1, the high-hardness layer 22 was provided side by side with the conductor-containing layer 20.

TABLE 1

| | Deflection amount | Example 1 | Comparative Example 1 |
|---|---|---|---|
| Number of cracks generated | 2 mm | 0/10 | 3/10 |
| | 4 mm | 0/10 | 10/10 |

As shown above, according to Example 1, the element body part 10 has the conductor-containing layer 20 in which the coil conductor 36 (functional part) is provided, as well as the high-hardness layer 22 provided side by side with the conductor-containing layer 20 in a direction parallel with the bottom face 14 (mounting surface) of the element body part 10. Because the high-hardness layer 22 having a higher hardness compared to the conductor-containing layer 20 is provided side by side with the conductor-containing layer 20 in a direction parallel with the bottom face 14 of the element body part 10, as described above, generation of cracks in the deflection test can be suppressed as explained using Table 1, and therefore the mechanical strength of the element body part 10 can be improved.

Also, according to Example 1, the high-hardness layer 22 contains, by a higher percentage than does the conductor-containing layer 20, a filler made of at least metal oxide or $SiO_2$. Because of this, the hardness of the high-hardness layer 22 can be increased beyond that of the conductor-containing layer 20 with ease, which means that the mechanical strength of the element body part 10 can be improved with ease.

Also, according to Example 1, the coil conductor 36 is provided inside the conductor-containing layer 20, and not inside the high-hardness layer 22. Because of this, the conductor-containing layer 20 can be formed using a material suitable for the electrical characteristics of the coil conductor 36 to improve the electrical characteristics, while also improving the mechanical strength of the element body part 10 at the same time.

Also, according to Example 1, the conductor-containing layer 20 having the coil conductor 36 inside, has a lower dielectric constant compared to the high-hardness layer 22. Because of this, the parasitic capacitance generating between the conductor parts of the coil conductor 36 can be reduced to improve the self-resonating frequency, and therefore the Q-value can be improved. For example, the conductor-containing layer 20 may have a lower dielectric constant compared to the high-hardness layer 22 owing to the fact that it contains, by a higher percentage than does the high-hardness layer 22, the Si component in the material constituting the layer. In addition, when the dielectric constant of the conductor-containing layer 20 is lower than that of the high-hardness layer 22, preferably the coil conductor 36 is provided inside the conductor-containing layer 20, and not inside the high-hardness layer 22, from the viewpoint of improving the Q-value.

Also, according to Example 1, the coil conductor 36 has a coil axis running roughly in parallel with the bottom face 14 (mounting surface) of the element body part 10. When the coil axis is present in a direction vertical to the bottom face 14 (mounting surface) of the element body part 10, for example, the magnetic flux may change due to the alternating current that flows through the coil conductor, and therefore eddy current may generate on the mounting board where the electronic component is mounted. This results in a lower Q-value. When the coil axis is present in a direction roughly parallel with the bottom face 14 (mounting surface) of the element body part 10, on the other hand, generation of eddy current on the mounting board is suppressed and therefore lowering of the Q-value can be suppressed.

Figure 6:
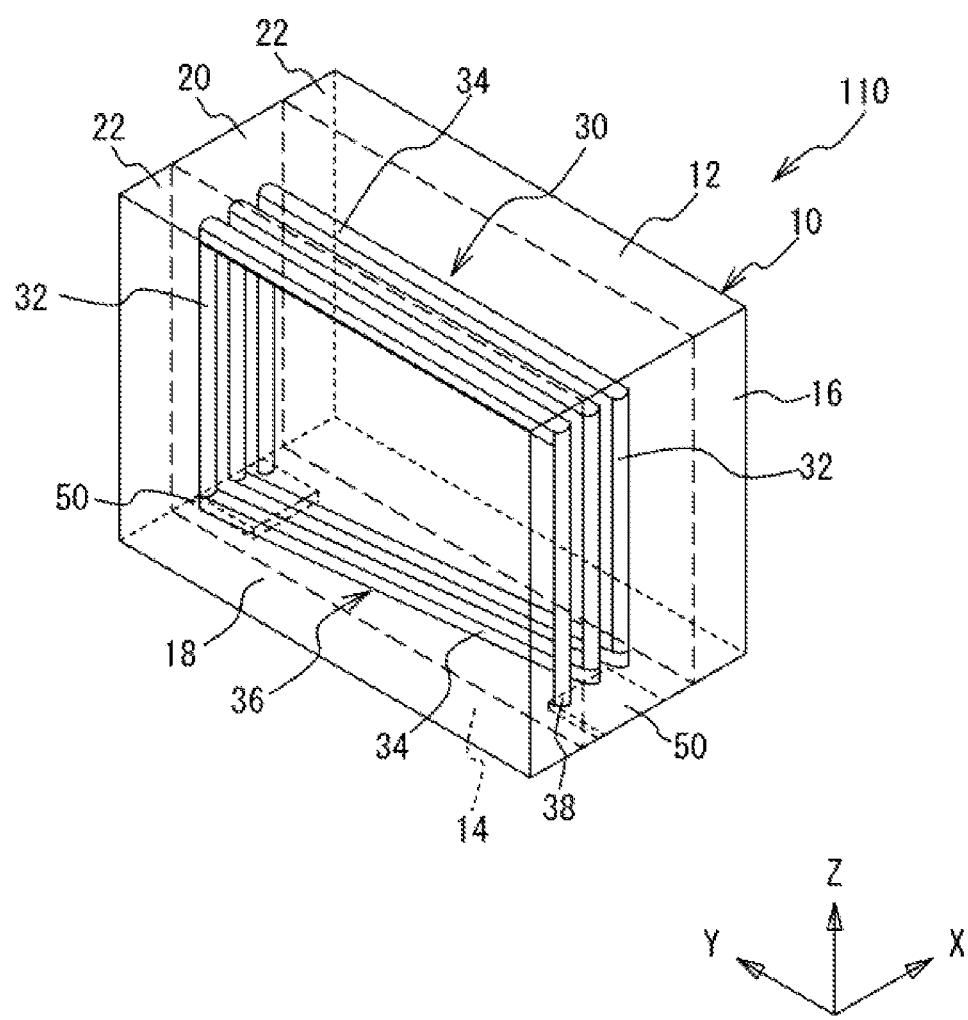
FIG. 6 is an oblique perspective view of the electronic component pertaining to Variation Example 1 of Example 1.

FIG. 6 is an oblique perspective view of the electronic component pertaining to Variation Example 1 of Example 1. As shown in FIG. 6, an electronic component 110 in Variation Example 1 of Example 1 is such that the external electrodes 50 are provided only on both Y-axis direction ends of the bottom face 14 of the element body part 10, and not on the end faces 16. The coil conductor 36 is electrically connected to the external electrodes 50, via the lead conductors 38, at the bottom face 14 of the element body part 10. Other constitutions are the same as in Example 1 and therefore not explained.

In Example 1, the coil conductor 36 was electrically connected to the external electrodes 50, via the lead conductors 38, at the end faces 16 of the element body part 10, as shown in FIG. 1; instead, the coil conductor 36 may be electrically connected to the external electrodes 50, via the lead conductors 38, at the bottom face 14 (mounting surface) of the element body part 10, as shown in Variation Example 1 of Example 1. In addition, by providing the external electrodes 50 only on the bottom face 14 of the element body part 10 and causing the coil conductor 36 to be electrically connected to the external electrodes 50 at the bottom face 14 of the element body part 10, the parasitic capacitance generating between the external electrodes 50 and internal conductor 30 can be reduced.

Although not illustrated, the coil conductor 36 may be electrically connected to the external electrodes 50, via the lead conductors 38, at the side faces 18 of the element body part 10.

Figure 7A:
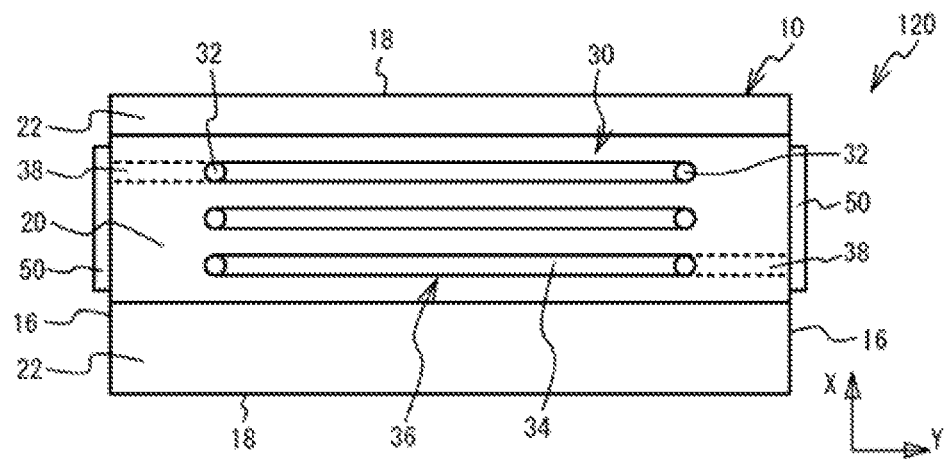
FIG. 7A to FIG. 7C are top cross-sectional views of the electronic components pertaining to Variation Example 2 to Variation Example 4 of Example 1.
Figure 7B:
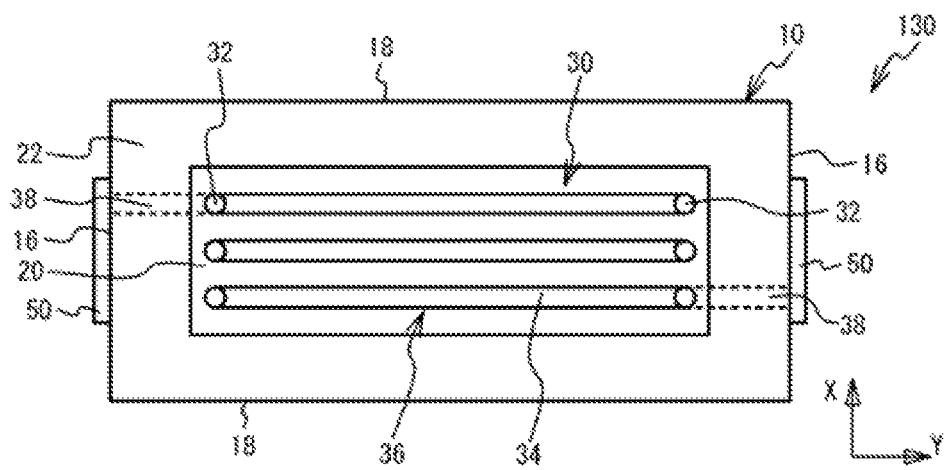
Figure 7C:
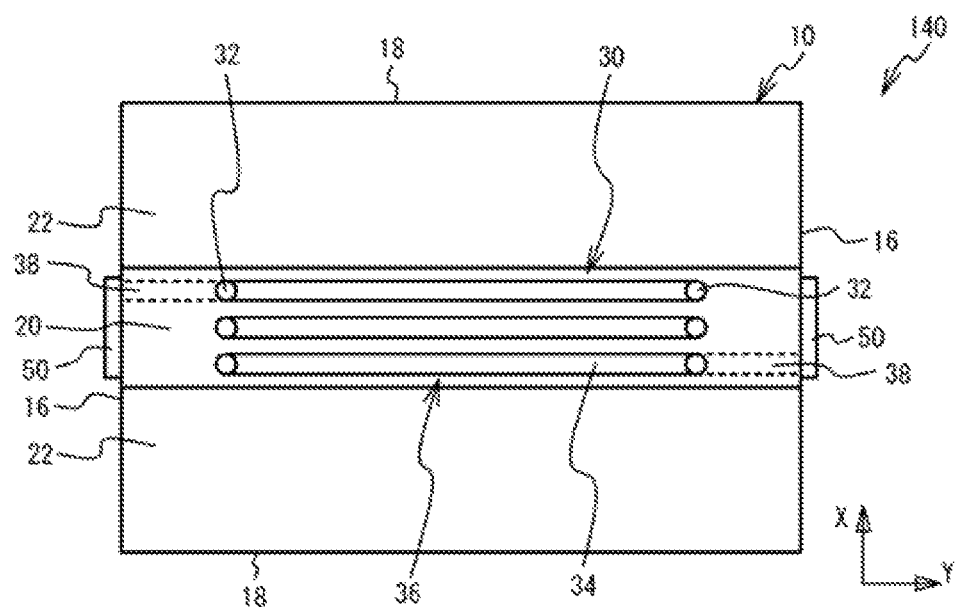

FIG. 7A to FIG. 7C are top cross-sectional views of the electronic component pertaining to Variation Example 2 to Variation Example 4 of Example 1. As shown in FIG. 7A, an electronic component 120 in Variation Example 2 of Example 1 is such that the conductor-containing layer 20 is shifted toward one of the pair of side faces 18 of the element body part 10. Accordingly, one of the high-hardness layers 22 sandwiching the conductor-containing layer 20 is thinner than the other in the X-axis direction. Other constitutions are the same as in Example 1 and therefore not explained.

Example 1 shows a case where the conductor-containing layer 20 was provided at the center of the pair of side faces 18 of the element body part 10; instead, as shown in Variation Example 2 of Example 1, the conductor-containing layer 20 may be shifted toward one of the pair of side faces 18. In this case, the orientation of the electronic component can be identified from the difference in thickness between the high-hardness layers 22 sandwiching the conductor-containing layer 20.

As shown in FIG. 7B, an electronic component 130 in Variation Example 3 of Example 1 is such that the conductor-containing layer 20 which has the coil conductor 36 (functional part) inside is provided inside the element body part 10, with the high-hardness layer 22 provided in a manner covering the conductor-containing layer 20. The lead conductors 38, which are non-functional parts of the internal conductor 30, are provided in the high-hardness layer 22. Other constitutions are the same as in Example 1 and therefore not explained.

Example 1 shows a case where the conductor-containing layer 20 extended from one, to the other, of the pair of end faces 16 of the element body part 10; instead, as shown in Variation Example 3 of Example 1, the conductor-containing layer 20 may be provided inside the element body part 10. In this case, mechanical strength can be improved further because the high-hardness layer 22 is provided around the conductor-containing layer 20. In addition, providing the lead conductors 38, or non-functional parts, in the high-hardness layer 22 has minimal impact on the electrical characteristics.

As shown in FIG. 7C, an electronic component 140 in Variation Example 4 of Example 1 is such that the conductor-containing layer 20 is thinner than the high-hardness layer 22 in the X-axis direction. Other constitutions are the same as in Example 1 and therefore not explained.

Example 1 shows a case where the conductor-containing layer 20 was thicker than the high-hardness layer 22 in the X-axis direction; instead, as shown in Variation Example 4 of Example 1, the conductor-containing layer 20 may be thinner than the high-hardness layer 22 in the X-axis direction. When the conductor-containing layer 20 is thicker than the high-hardness layer 22, the coil conductor 36 can be made larger and therefore the inductance value can be increased. When the high-hardness layer 22 is thicker than the conductor-containing layer 20, on the other hand, the mechanical strength of the element body part 10 can be enhanced.

Example 2

Figure 8:
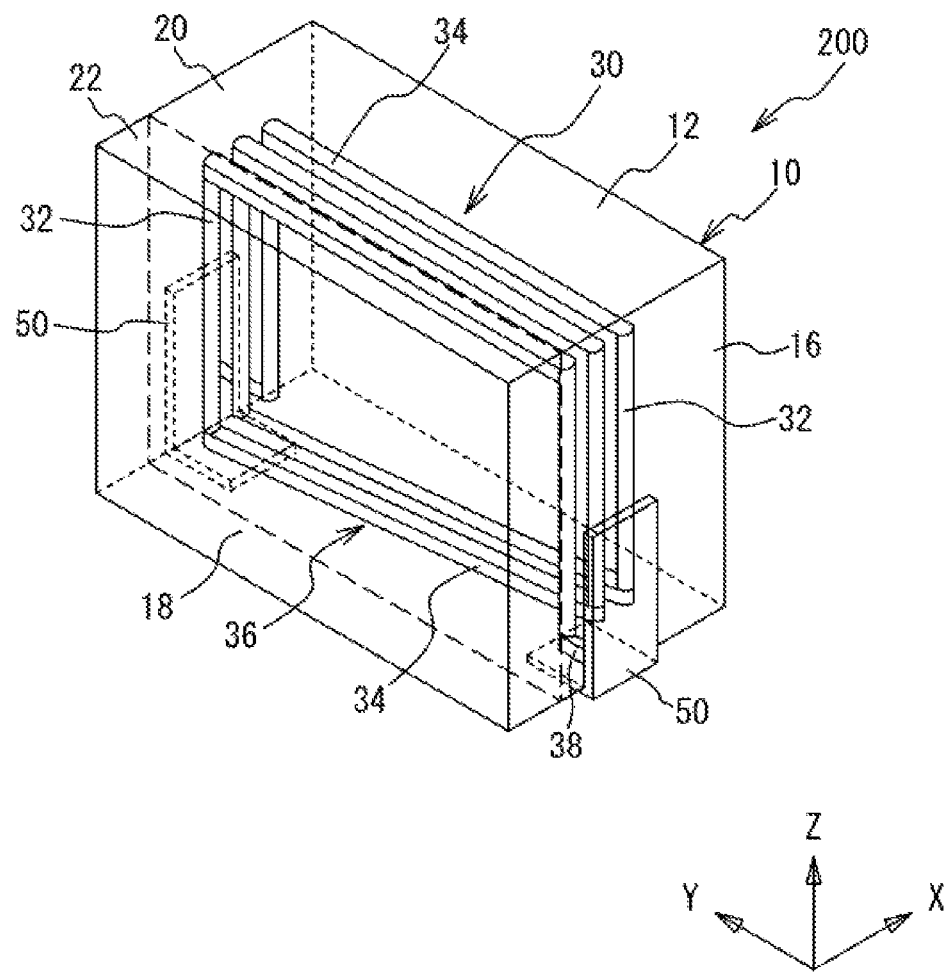
FIG. 8 is an oblique perspective view of the electronic component pertaining to Example 2.

FIG. 8 is an oblique perspective view of the electronic component pertaining to Example 2. As shown in FIG. 8, an electronic component 200 in Example 2 is such that the high-hardness layer 22 is provided only on one side of the conductor-containing layer 20, while the part corresponding to the other side where the high-hardness layer 22 was provided in Example 1 is occupied by the conductor-containing layer 20. Other constitutions are the same as in Example 1 and therefore not explained.

The inventor conducted a deflection test on the electronic component in Example 2. The deflection test was conducted according to the same method explained in Example 1, and the dimensions of the electronic component, etc., were the same as in Example 1. Table 2 shows the deflection test results. It should be noted that the test results of Comparative Example 1 in Table 1 are also shown for the purpose of comparison.

TABLE 2

|  | Deflection amount | Example 2 | Comparative Example 1 |
|---|---|---|---|
| Number of cracks generated | 2 mm | 0/10 | 3/10 |
|  | 4 mm | 2/10 | 10/10 |

As shown in Table 2, none of the 10 chips tested under Example 2 generated cracks when the deflection amount of the mounting board was adjusted to 2 mm. When the deflection amount of the mounting board was adjusted to 4 mm, two of the 10 chips according to Example 2 generated cracks.

As shown in Example 2, the mechanical strength of the element body part 10 can be improved so long as the high-hardness layer 22 is provided side by side with the conductor-containing layer 20 in a direction parallel with the bottom face 14 (mounting surface) of the element body part 10, even when the high-hardness layer 22 is provided only on one side of the conductor-containing layer 20. In addition, the test results in Table 1 and Table 2 show that, from the viewpoint of improving the mechanical strength of the element body part 10, preferably the high-hardness layer 22 is provided in a manner sandwiching the conductor-containing layer 20.

Example 3

Figure 9:
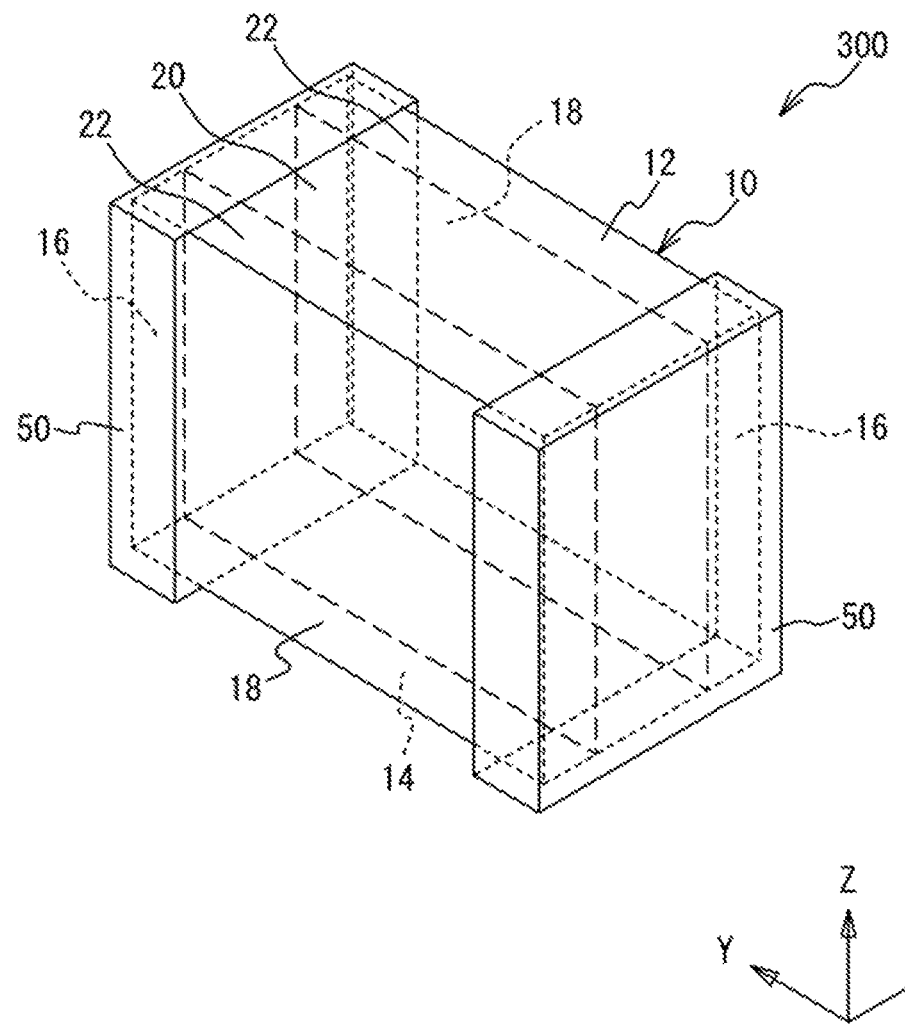
FIG. 9 is an oblique perspective view of the electronic component pertaining to Example 3.

FIG. 9 is an oblique perspective view of the electronic component pertaining to Example 3. It should be noted that, in FIG. 9, the internal conductor 30 has the same structure as in Example 1 and is therefore not illustrated in FIG. 9. As shown in FIG. 9, an electronic component 300 in Example 3 is such that external electrodes 50 are provided in a manner extending from the bottom face 14, via the end faces 16, to the top face 12, while also extending from the end faces 16, to the side faces 18, of the element body part 10. In other words, the external electrodes 50 cover the entire end faces 16, as well as parts of the top face 12, bottom face 14, and side faces 18. Other constitutions are the same as in Example 1 and therefore not explained.

The inventor conducted a deflection test on the electronic component in Example 3. The deflection test was conducted according to the same method explained in Example 1, and the dimensions of the electronic component, etc., were the same as in Example 1. Table 3 shows the deflection test results. It should be noted that the test results of Comparative Example 1 in Table 1 are also shown for the purpose of comparison.

TABLE 3

|  | Deflection amount | Example 3 | Comparative Example 1 |
|---|---|---|---|
| Number of cracks generated | 2 mm | 0/10 | 3/10 |
|  | 4 mm | 0/10 | 10/10 |

As shown in Table 3, none of the 10 chips tested under Example 3 generated cracks when the deflection amount of the mounting board was adjusted to 2 mm or 4 mm.

The deflection tests results of Example 1 to Example 3 show that the mechanical strength of the element body part 10 can be improved so long as the high-hardness layer 22 is provided side by side with the conductor-containing layer 20 in a direction parallel with the bottom face 14 (mounting surface) of the element body part 10, no matter what the shape of the external electrode 50 is.

Example 4

Figure 10A:
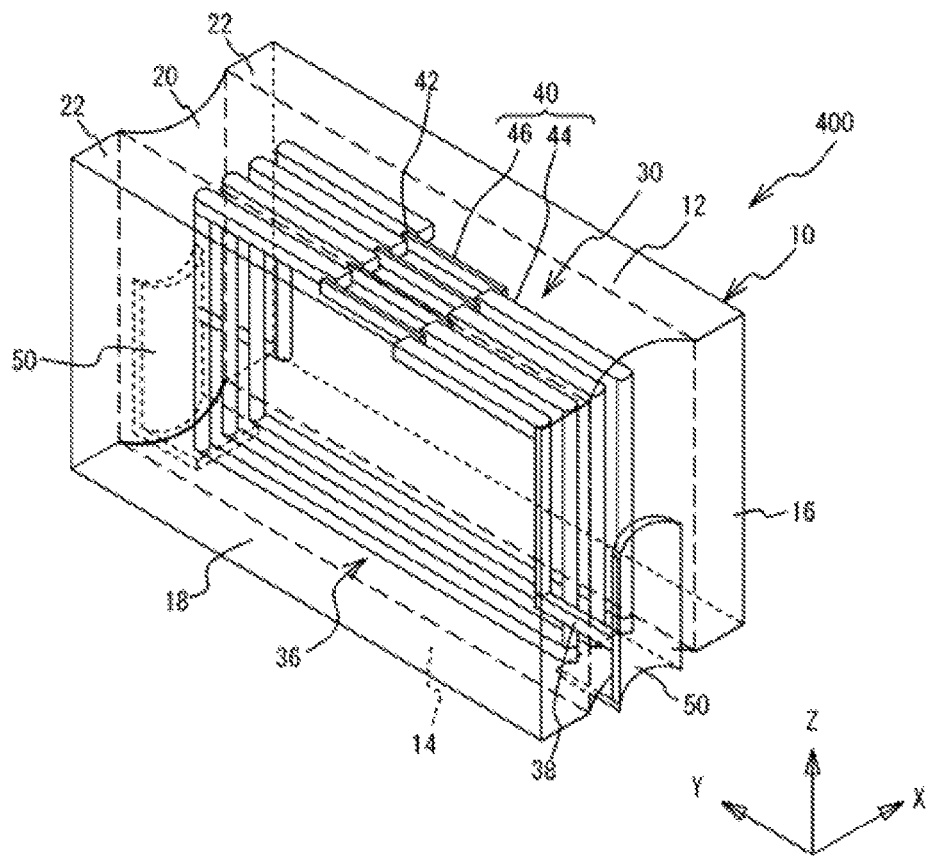
FIG. 10A is an oblique perspective view.
Figure 10B:
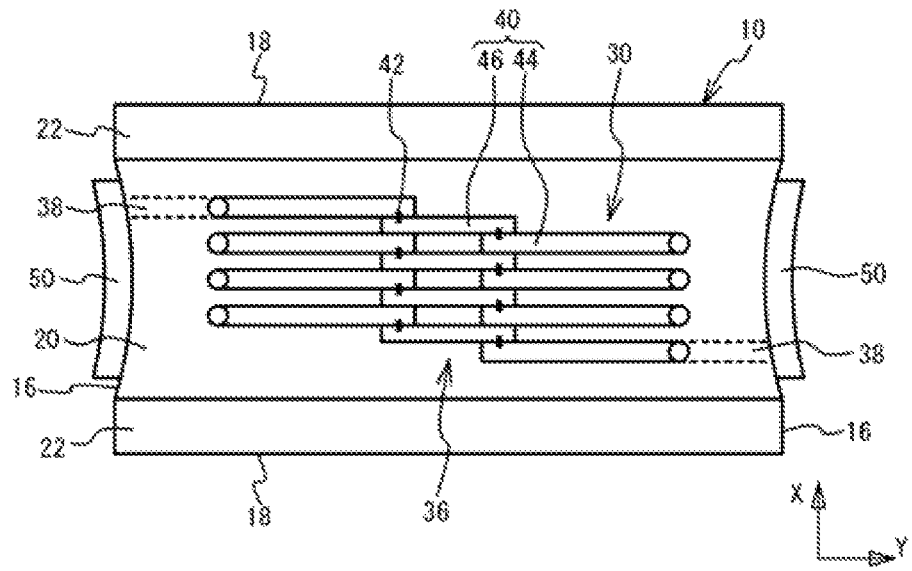
FIG. 10B is a top cross-sectional view, of the electronic component pertaining to Example 4.

FIG. 10A is an oblique perspective view, and FIG. 10B is a top cross-sectional view, of the electronic component pertaining to Example 4. As shown in FIG. 10A and FIG. 10B, an electronic component 400 in Example 4 is such that the internal conductor 30 has conductor patterns 40, via hole conductors 42 and lead conductors 38. Also, on the end faces 16, the conductor-containing layer 20 is recessed with respect to the high-hardness layer 22. Other constitutions are the same as in Example 1, so the following explains the internal conductor 30 and the remainder is not explained.

In the internal conductor 30, the via hole conductors 42 electrically connect the multiple conductor patterns 40. The conductor patterns 40 include C-shaped patterns 44 and I-shaped patterns 46, for example.

Figure 11:
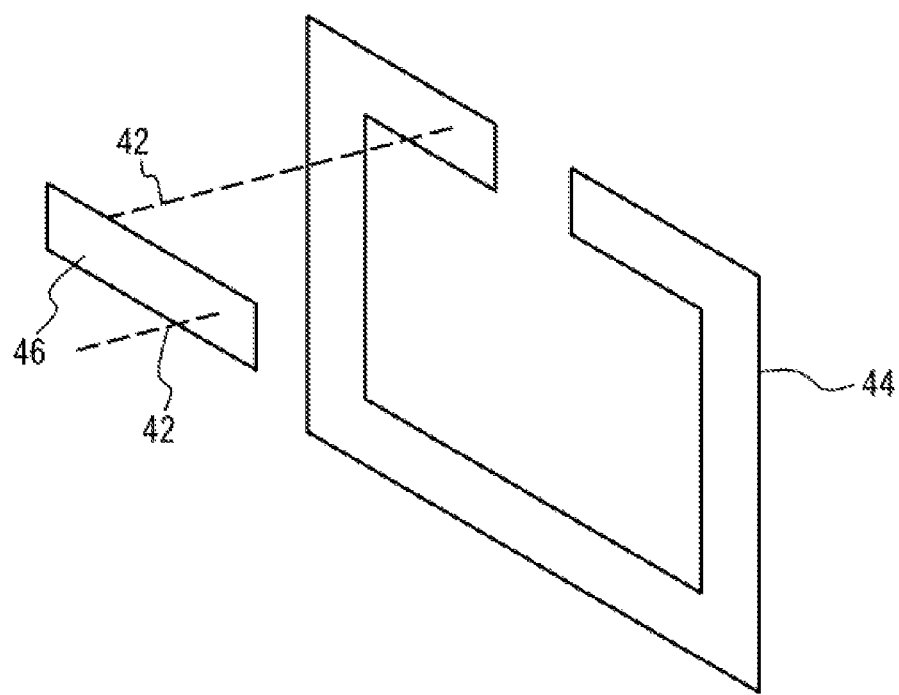
FIG. 11 is a drawing explaining a C-shaped pattern and an I-shaped pattern.

FIG. 11 is a drawing explaining a C-shaped pattern and an I-shaped pattern. As shown in FIG. 11, the C-shaped pattern 44 represents a polygonal conductor pattern having three or more apexes. For example, the C-shaped pattern 44 corresponds to a roughly rectangular shape having four apexes and also missing a part of one side of the roughly rectangular shape. It should be noted that the term "roughly rectangular shape" is not limited to the rectangular shape shown in FIG. 11, but it also includes oval and other shapes that can approximate a rectangle. It includes shapes having four apexes like the one shown in FIG. 11, as well as roughly rectangular shapes that have no clear apexes but have locations that can be recognized as apexes on a rectangle they approximate. It should be noted that the dotted lines in FIG. 11 indicate positions where via hole conductors 42 are formed.

The I-shaped pattern 46 supplements the missing part of one side of the C-shaped pattern in the roughly rectangular shape. Matching the actual shape of the roughly rectangular shape, the I-shaped pattern 46 may be linear, as shown in FIG. 11, or it may have a curved shape constituting a part of an oval shape. Combined use of the C-shaped pattern 44 and the I-shaped pattern 46 increases the dimensional stability of the coil conductor and makes it possible to narrow the tolerance on inductance. Preferably the length of the I-shaped pattern 46 is greater than the length of the missing part of the C-shaped pattern 44. This further increases the reliability of electrical connection.

Figure 12:
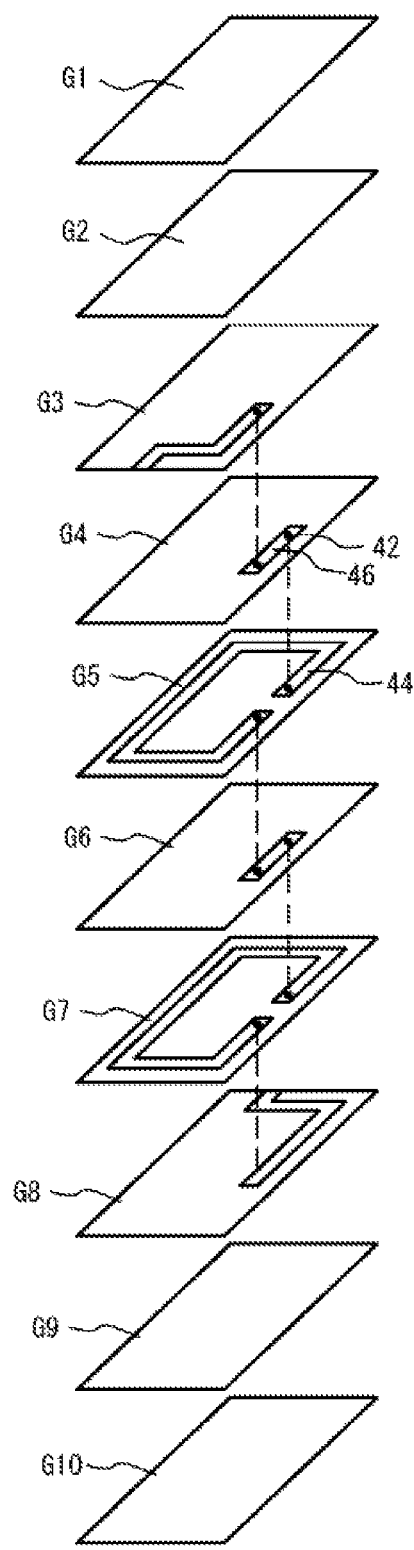
FIG. 12 is a drawing showing how the electronic component pertaining to Example 4 is manufactured.

Next, how the electronic component 400 in Example 4 is manufactured, is explained. FIG. 12 is a drawing showing how the electronic component in Example 4 is manufactured. It should be noted that the electronic component 400 in Example 4 is formed by stacking green sheets, each constituted by an insulating material, layer by layer from one side, to the other side, of the pair of side faces 18 of the element body part 10.

As shown in FIG. 12, green sheets G1 to G10 that are precursors of the insulative layers which will constitute the element body part 10, are prepared. A green sheet is formed by, for example, applying on a film a slurry of insulating material whose primary ingredient is glass, etc., using the doctor blade method, etc. It should be noted that, for the insulating material, a ferrite, dielectric ceramic, magnetic body using soft magnetic alloy material, or resin mixed with magnetic powder, or the like, may be used in addition to a material whose primary component is glass. The thickness of a green sheet is not limited in any way, and is between 5 μm and 60 μm, for example, where one example is 20 μm. Multiple types of green sheets with different contents by percentage of filler constituted by metal oxide and silicon are prepared. The green sheets G1, G10 represent green sheets containing a filler constituted by metal oxide by a higher percentage, while the green sheets G2 to G9 represent green sheets containing silicon by a higher percentage.

Through holes are formed in the green sheets G3 to G7 by means of laser processing, etc., at prescribed positions, or specifically positions where via hole conductors 42 are to be formed. Then, a conductive material is printed on the green sheets G3 to G8 using a printing method, to form C-shaped patterns 44, I-shaped patterns 46 and via hole conductors 42. The conductive material may have silver, copper or other metal as its primary component.

Next, the green sheets G1 to G10 are stacked in a prescribed order, and pressure is applied in the stacking direction to pressure-bond the green sheets. Then, the pressure-bonded green sheets are cut to individual chips, which are then sintered at a prescribed temperature (in a range of 700° C. to 900° C. or so, for example) to form element body parts 10. Now, because the green sheets G1, G10 contain a filler constituted by metal oxide and silicon, by different percentages than the green sheets G2 to G9, the two sets of green sheets exhibit different rates of contraction during sintering, and as a result, the conductor-containing layer 20 has a recessed shape with respect to the high-hardness layer 22, as shown in FIG. 10A and FIG. 10B.

Next, external electrodes 50 are formed at prescribed positions on the element body part 10. External electrodes 50 are formed by applying an electrode paste whose primary component is silver or copper, and then baking it at a prescribed temperature (in a range of 600° C. to 900° C. or so, for example), followed by electroplating, etc. For this electroplating, copper, nickel, or tin, etc., may be used, for example. The electronic component 400 in Example 4 has thus been formed.

Figure 13A:
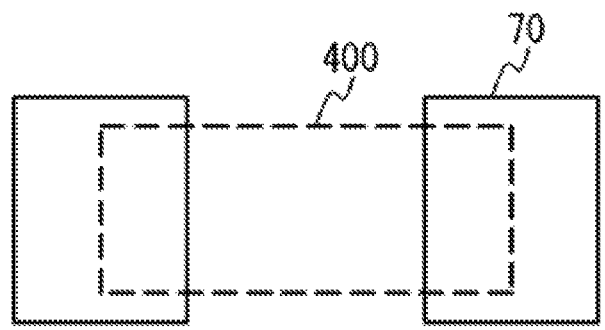
FIG. 13A and FIG. 13B are drawings explaining a mounting test of an electronic component.
Figure 13B:
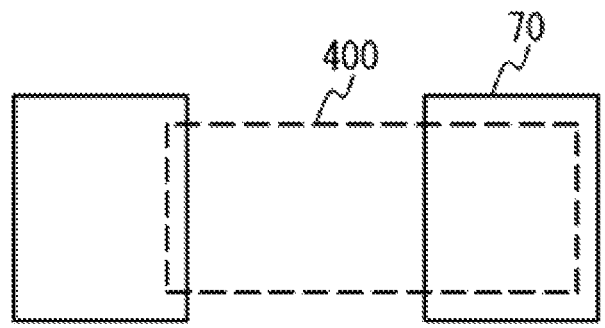

The inventor conducted a test of mounting the electronic component in Example 4 on a mounting board. FIG. 13A and FIG. 13B are drawings explaining the electronic component mounting test. FIG. 13A shows that the electronic component 400 is mounted at an appropriate position, with the electronic component 400 soldered to lands 70 of the mounting board. In the mounting test, in contrast, the electronic component 400 was intentionally mounted at a position shifted by 50 μm with respect to the lands 70, and the applicable mounting condition was checked. It should be noted that each land 70 has a rectangular shape of 0.2 mm long and 0.15 mm wide. The electronic component 400 has a size of 0.2 mm in width, 0.4 mm in length and 0.2 mm in height.

Table 4 shows the mounting test results. It should be noted that the test result of mounting the electronic component 1000 in Comparative Example 1 on a mounting board is also shown for the purpose of comparison. The size of the electronic component 1000 in Comparative Example 1 is the same as that of the electronic component 400 in Example 4. As shown in Table 4, while the rate of mounting defects was 0% under Example 4, it was 2.25% under Comparative Example 1. It should be noted that "mounting defects" refer to phenomena of standing chips (such as the Manhattan phenomenon and tombstone phenomenon).

TABLE 4

|  | Example 4 | Comparative Example 1 |
| --- | --- | --- |
| Rate of mounting defects | 0% | 2.25% |

As shown above, Example 4 resulted in fewer mounting defects compared to Comparative Example 1. The probable reason for this is explained as follows. To be specific, when the electronic component is mounted on the mounting board by soldering the external electrodes 50 of the electronic component to the lands 70 of the mounting board, the tensions from the molten solder act as driving force to produce the self-alignment effect, at the time of mounting, which moves the electronic component to the center of the mounting position so as to balance the tensions generated in the external electrodes 50 provided on the respective faces of the element body part 10. This self-alignment effect can suppress the turning of the electronic component in the horizontal direction with respect to the mounting surface, as well as the standing of the component (phenomenon where the electronic component separates from one land and stands upright on the other land), at the time of mounting.

The larger the amount of solder, the greater the self-alignment effect (self-alignment force) becomes, and also because solder spreads over and wets the external electrodes 50, the larger the area of the external electrodes 50, the greater the self-alignment effect becomes. While the end faces 16 of the conductor-containing layer 20 are flat faces in Comparative Example 1, the end faces 16 of the conductor-containing layer 20 have a recessed shape with respect to the high-hardness layer 22 in Example 4. Because of this, a larger amount of solder can be supplied to the lands 70 and also the external electrodes 50 are soldered over a larger area, and consequently the self-alignment effect becomes greater, in Example 4, compared to Comparative Example 1. Also, in Example 4, the conductor-containing layer 20 has a curved shape which is recessed with respect to the high-hardness layer 22, on the end faces 16 of the element body part 10, and therefore the external electrodes 50 provided on the conductor-containing layer 20 also have a curved shape. Because of this, the self-alignment force acts toward the center of the mounting position and therefore the electronic component can be moved to an appropriate position with ease. Example 4 resulted in fewer mounting defects compared to Comparative Example 1, probably due to the foregoing.

According to Example 4, the conductor-containing layer 20 is recessed with respect to the high-hardness layer 22 on the end faces 16 of the element body part 10. The external electrodes 50 extend from the bottom face 14, to the end faces 16, of the element body part 10 and are provided at least on the conductor-containing layer 20 on the end faces 16. This way, the self-alignment property of the electronic component when it is mounted on a mounting board, can be improved. It should be noted that, as shown in Example 4, preferably the external electrodes 50 are provided only on the conductor-containing layer 20, and not on the high-hardness layer 22, on the end faces 16. In addition, when external electrodes 50 are formed on the conductor-containing layer 20, the formation of external electrodes 50 in a manner spreading onto the high-hardness layer 22 can be suppressed because the conductor-containing layer 20 is recessed with respect to the high-hardness layer 22. In other words, external electrodes 50 can be formed only on the surface of the conductor-containing layer 20, and not on the high-hardness layer 22, with ease.

FIG. 14A is an oblique perspective view, FIG. 14B is a view from the top-face side, and FIG. 14C is a view from the end-face side, of the electronic component pertaining to Variation Example 1 of Example 4. As shown in FIG. 14A to FIG. 14C, an electronic component 410 in Variation Example 1 of Example 4 is such that the external electrodes 50 are provided on both the conductor-containing layer 20 and high-hardness layer 22 on the bottom face 14 and end faces 16 of the element body part 10. On the end faces 16, the external electrodes 50 have a curved shape along the conductor-containing layer 20, bending in such a way that their height in the Z-axis direction is greater on the high-hardness layer 22 than on the conductor-containing layer 20. The external electrodes 50 also have a curved shape on the bottom face 14. It should be noted that the external electrodes 50 may protrude onto the side faces 18 of the element body part 10. Other constitutions are the same as in Example 4 and therefore not explained. The self-alignment property can also be improved in Variation Example 1 of Example 4, as in Example 4.

Figure 15:
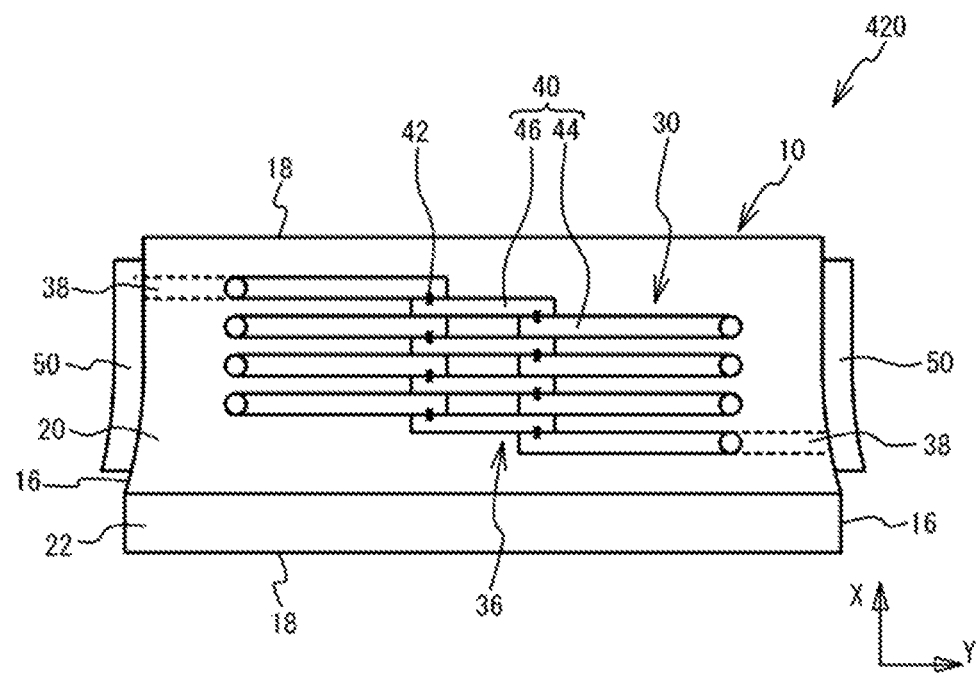
FIG. 15 is a top cross-sectional view of the electronic component pertaining to Variation Example 2 of Example 4.

FIG. 15 is a top cross-sectional view of the electronic component pertaining to Variation Example 2 of Example 4. As shown in FIG. 15, an electronic component 420 in Variation Example 2 of Example 4 is such that the high-hardness layer 22 is provided only on one side of the conductor-containing layer 20. Other constitutions are the same as in Example 4 and therefore not explained.

The inventor conducted a test of mounting the electronic component in Variation Example 2 of Example 4 on a mounting board. The mounting test was conducted according to the same method explained in Example 4, and the dimensions of the electronic component, etc., were the same as in Example 4. Table 5 shows the mounting test results. It should be noted that the test results of Comparative Example 1 shown in Table 4 are also shown for the purpose of comparison.

TABLE 5

|  | Variation Example 2 of Example 4 | Comparative Example 1 |
|---|---|---|
| Rate of mounting defects | 0.75% | 2.25% |

As shown in Table 5, the rate of mounting defects under Variation Example 2 of Example 4 was 0.75%.

The self-alignment property can still be improved even when the high-hardness layer 22 is provided only on one side of the conductor-containing layer 20, as is the case of Variation Example 2 of Example 4. The test results in Table 4 and Table 5 show that, from the viewpoint of improving the self-alignment property, preferably the high-hardness layer 22 is provided in a manner sandwiching the conductor-containing layer 20.

Example 5

FIG. 16A is a top cross-sectional view, FIG. 16B is a side cross-sectional view, and FIG. 16C is an end cross-sectional view, of the electronic component pertaining to Example 5. As shown in FIG. 16A to FIG. 16C, an electronic component 500 in Example 5 is such that the coil conductor 36 has a coil axis running in the Y-axis direction (length direction) and its opening has a rectangular shape. Other constitutions are the same as in Example 1 and therefore not explained.

Example 1 to Example 4 show cases where the coil conductor 36 is wound around the coil axis running in the X-axis direction; instead, the coil conductor 36 may be wound around the coil axis running in the Y-axis direction, as shown in Example 5.

Example 6

Figure 17A:
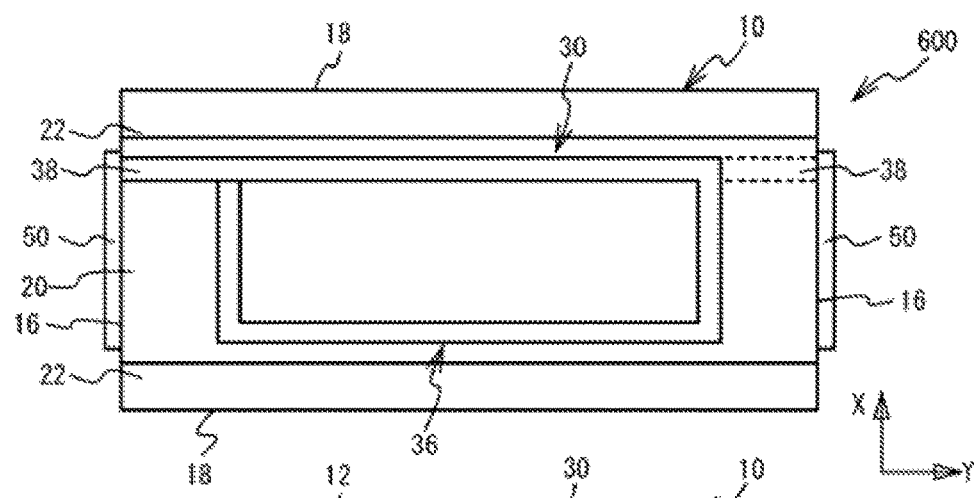
FIG. 17A is a top cross-sectional view.
Figure 17B:
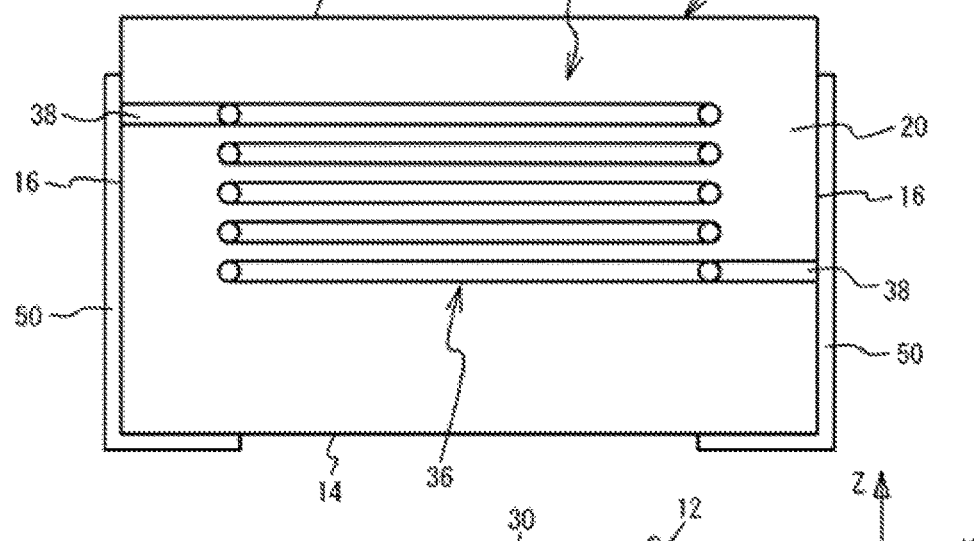
FIG. 17B is a side cross-sectional view.
Figure 17C:
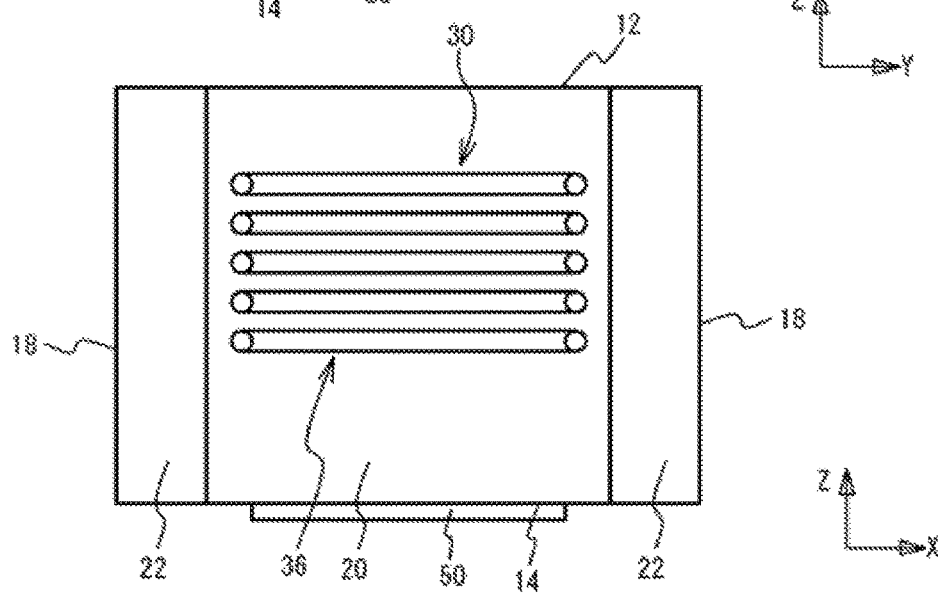
FIG. 17C is an end cross-sectional view, of the electronic component pertaining to Example 6.

FIG. 17A is a top cross-sectional view, FIG. 17B is a side cross-sectional view, and FIG. 17C is an end cross-sectional view, of the electronic component pertaining to Example 6. As shown in FIG. 17A and FIG. 17C, an electronic component 600 in Example 6 is such that the coil conductor 36 provided in it has a coil axis running in the Z-axis direction (height direction) and its opening has a rectangular shape. In other words, the coil conductor 36 is wound horizontally. The coil conductor 36 is provided on the side closer to the top face 12, of the center of the element body part 10 in the Z-axis direction. Other constitutions are the same as in Example 1 and therefore not explained.

Figure 18:
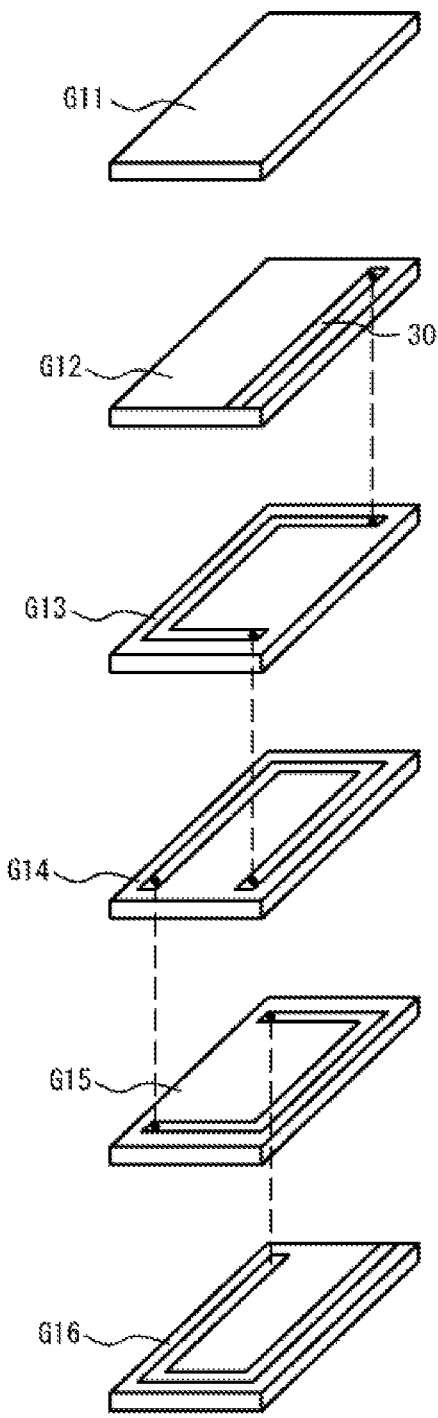
FIG. 18 is a drawing showing how the electronic component pertaining to Example 6 is manufactured (part 1).
Figure 19A:
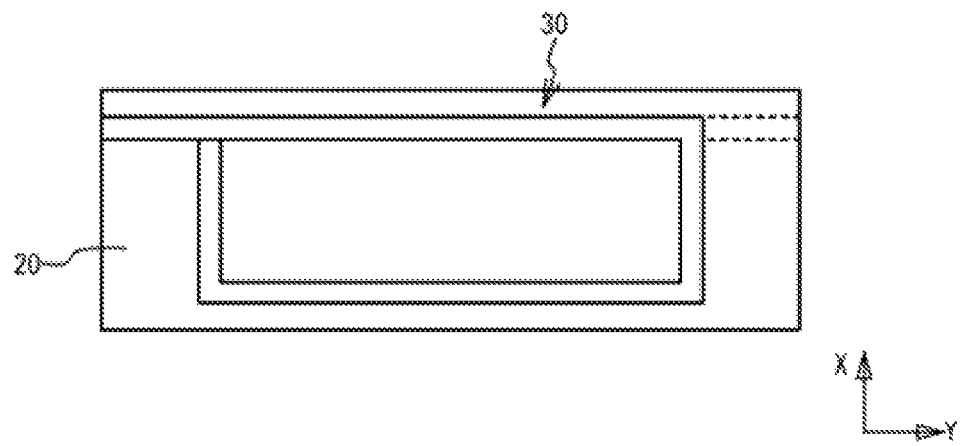
FIG. 19A and FIG. 19B are drawings showing how the electronic component pertaining to Example 6 is manufactured (part 2).
Figure 19B:
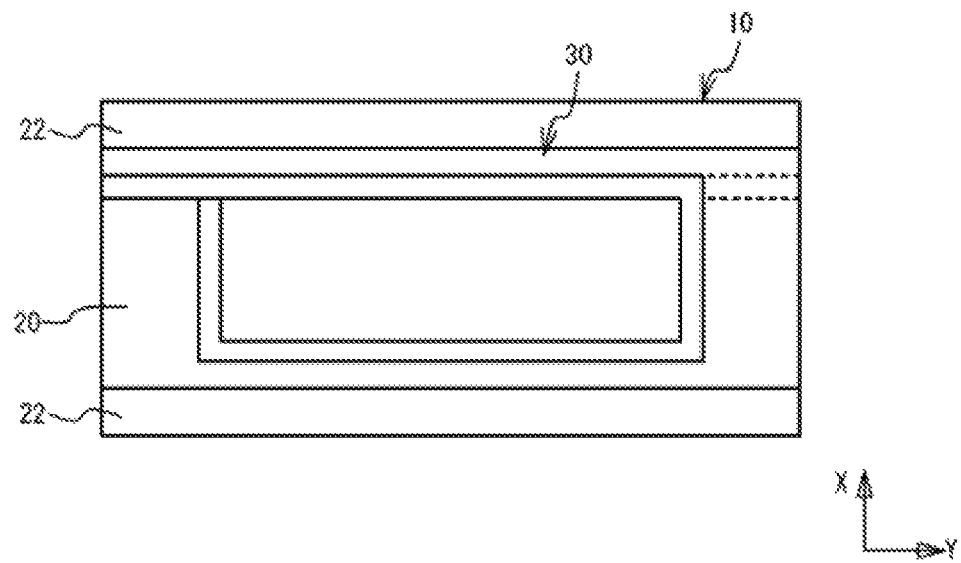

FIG. 18 to FIG. 19B are drawings showing how the electronic component pertaining to Example 6 is manufactured. FIG. 19A and FIG. 19B are drawings corresponding to top cross-sectional views of the electronic component in Example 6. As shown in FIG. 18, multiple insulating green sheets G11 to G16 that are precursors of the conductor-containing layer 20, are prepared. The green sheets were explained in Example 4 and are therefore not explained here.

Through holes are formed in the green sheets G12 to G15 by means of laser processing, etc., at prescribed positions. Then, a conductive material is printed on the green sheets G12 to G16 using a printing method, to form an internal conductor 30.

Next, the green sheets G11 to G16 are stacked in a prescribed order, and pressure is applied in the stacking direction to pressure-bond the green sheets. Then, the pressure-bonded green sheets are cut into individual chips, which are then sintered at a prescribed temperature (in a range of 700° C. to 900° C. or so, for example). This way, a conductor-containing layer 20 having an internal conductor 30 inside, is formed, as shown in FIG. 19A.

Next, as shown in FIG. 19B, a slurry, paste, ink, etc., is printed, dip-coated, or formed into the shape of a sheet and then bonded, or the like, on both sides of the conductor-containing layer 20, to form high-hardness layers 22. This way, an element body part 10 having the high-hardness layers 22 provided in a manner sandwiching the conductor-containing layer 20, is formed. Thereafter, external electrodes 50 are formed at prescribed positions on the element body part 10. The electronic component 600 in Example 6 has thus been formed.

The conductor-containing layer 20 may be formed using: a method whereby through holes are formed in the green sheets, and then internal conductor parts are formed, as described above, after which the green sheets are stacked in a prescribed order and then pressure-bonded to form a coil, followed by sintering of the pressure-bonded sheets; a method not involving sintering whereby the internal conductor, etc., are produced by the thin film method using resin, etc., for insulating layers; or a method not involving sintering whereby a conductor which will become the internal conductor is wound in the shape of a coil and then fixed in place using resin, etc. In addition, the coil winding direction includes horizontal winding where the coil axis is running orthogonal to the mounting surface, and two types of vertical winding where the coil axis is running in parallel with the mounting surface and the coil axis roughly corresponds to the length direction or width direction of the mounting surface, and any of the foregoing three types of winding may be applied.

The high-hardness layer 22 can be formed by means of printing, dip-coating, sheet-bonding, or the like, but depending on the slurry, paste, ink, adhesive, binder, etc., used for each such method, sintering can or cannot be performed. If sintering can be performed, the process procedure may be such that the two layers are sintered simultaneously when the conductor-containing layer 20 is sintered during the course of its production, or the process procedure may be such that each layer is sintered separately. If sintering cannot be performed, on the other hand, the conductor-containing layer 20 is completed first, and then the high-hardness layer 22 is formed, regardless of whether or not the conductor-containing layer 20 is sintered during the course of its production.

When the high-hardness layer 22 is added to/formed on the conductor-containing layer 20, aligning multiple conductor-containing layers 20 and placing them on an adhesive sheet, etc., enables more efficient adding/forming compared to when an individual high-hardness layer 22 is added/formed separately.

In Example 1 to Example 5, the coil conductor 36 was wound vertically; instead, the coil conductor 36 may be wound horizontally as shown in Example 6. Also, according to Example 6, the coil conductor 36 is provided at a position closer to the top face 12 of the element body part 10. Because of this, the coil conductor 36 is placed away from the bottom face 14 being the mounting surface, and therefore any impact of the parasitic capacitance the coil conductor 36 receives from the mounting board after the electronic component has been installed on the mounting board, can be reduced, and consequently change in characteristics can be suppressed.

Example 7

Figure 20A:
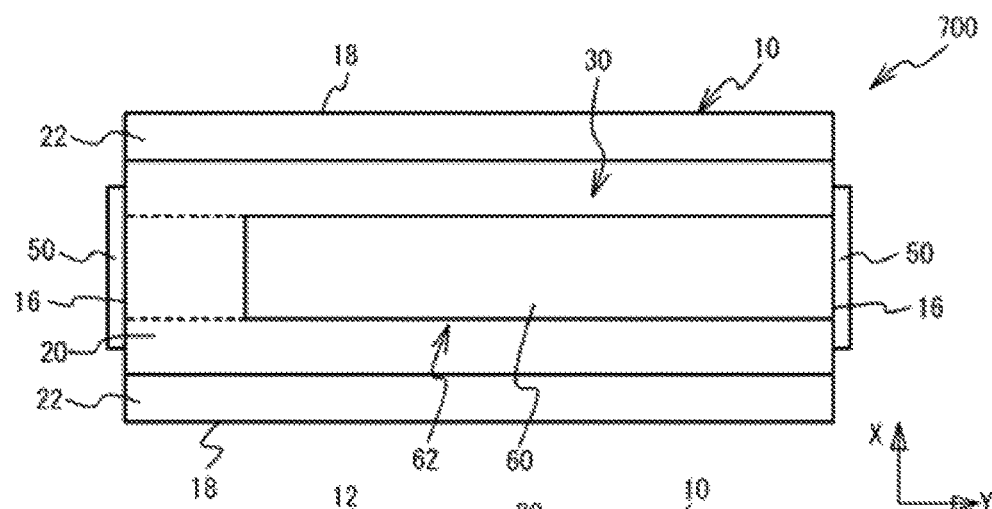
FIG. 20A is a top cross-sectional view.
Figure 20B:
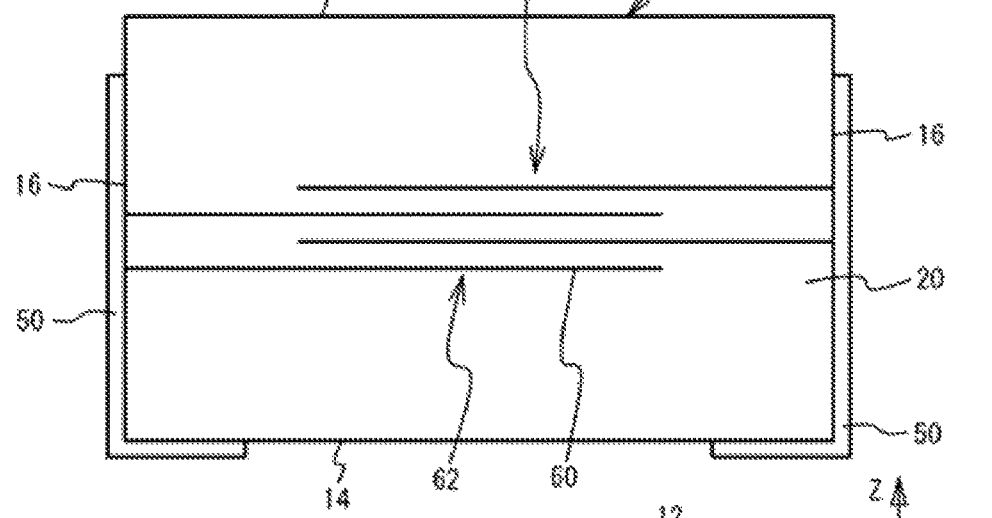
FIG. 20B is a side cross-sectional view.
Figure 20C:
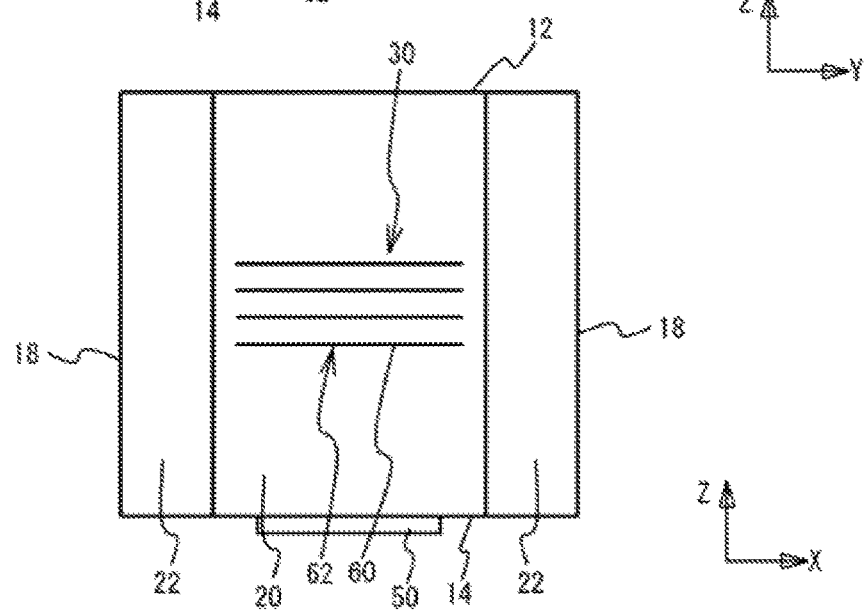
FIG. 20C is an end cross-sectional view, of the electronic component pertaining to Example 7.

FIG. 20A is a top cross-sectional view, FIG. 20B is a side cross-sectional view, and FIG. 20C is an end cross-sectional view, of the electronic component pertaining to Example 7. As shown in FIG. 20A to FIG. 20C, an electronic component 700 in Example 7 is such that the internal conductor 30 includes multiple flat electrodes 60. The area where the multiple flat electrodes 60 overlap one another represents a capacitor part 62, which is a functional part of the internal conductor 30 where electrical performance is demonstrated. The non-overlapping areas of the multiple flat electrodes 60 correspond to lead parts that electrically connect the capacitor part 62 to the external electrodes 50. In other words, the internal conductor 30 has a functional part which is the capacitor part 62 constituted by the area where the multiple flat electrodes 60 overlap one another, as well as non-functional parts corresponding to the non-overlapping areas of the multiple flat electrodes 60. Other constitutions are the same as in Example 1 and therefore not explained.

Example 1 to Example 6 show cases where the internal conductor 30 included a coil conductor 36 as its functional part, i.e., the electronic component was an inductor element; however, the present invention is not limited to these examples. As shown in Example 7, the internal conductor 30 may include a capacitor part 62 as its functional part, i.e., the electronic component may be a capacitor element. In addition, even when a capacitor part 62 is included as a functional part, the capacitor part 62 may be electrically connected to the external electrodes 50, via lead conductors, at the bottom face 14 of the element body part 10, in the same manner as in FIG. 6, or it may be electrically connected to the external electrodes 50 at the side faces 18 of the element body part 10.

Example 8

Figure 21A:
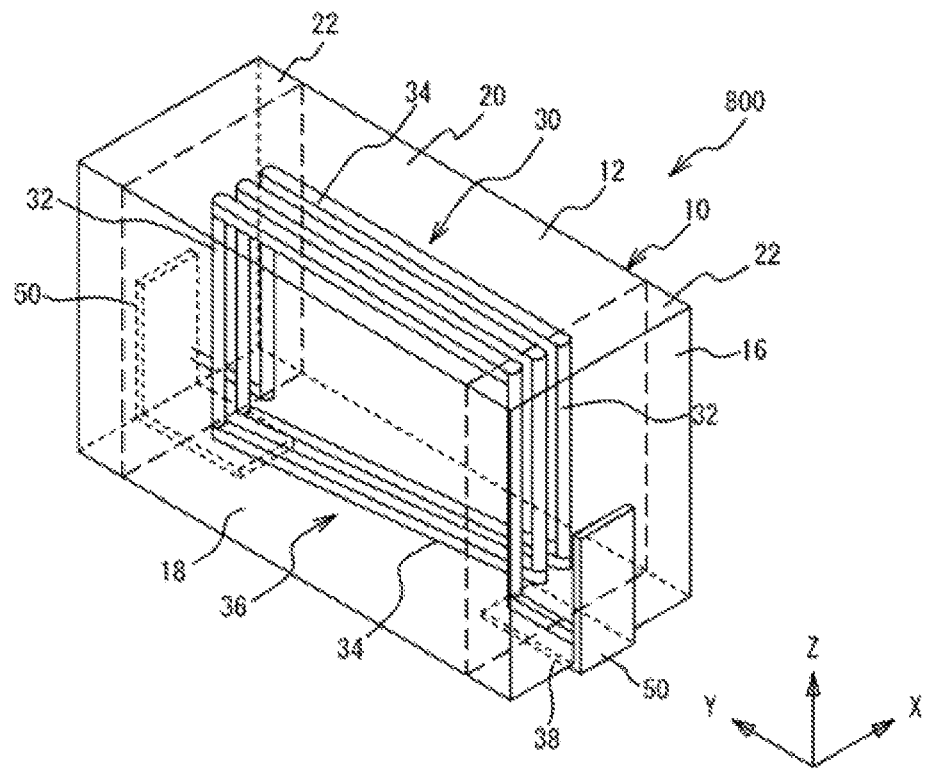
Figure 21B:
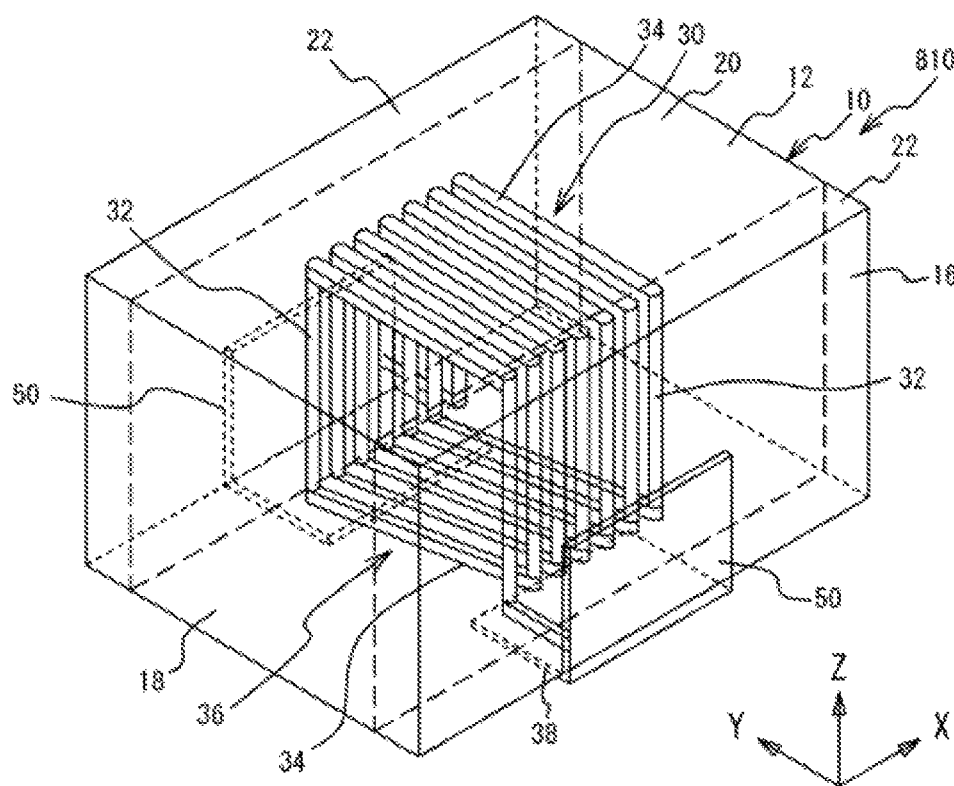
FIG. 21B is an oblique perspective view of the electronic component pertaining to Variation Example 1 of Example 8.

FIG. 21A is an oblique perspective view of the electronic component pertaining to Example 8, while FIG. 21B is an oblique perspective view of the electronic component pertaining to Variation Example 1 of Example 8. As shown in FIG. 21A, an electronic component 800 in Example 8 is such that the high-hardness layer 22 is provided side by side with the conductor-containing layer 20 in the Y-axis direction (length direction). The high-hardness layer 22 is provided on both sides of the conductor-containing layer 20 in a manner sandwiching the conductor-containing layer 20 in the Y-axis direction (length direction), to constitute the end faces 16 of the element body part 10. In the Y-axis direction, the thickness of the conductor-containing layer 20 is greater than that of the high-hardness layer 22. The coil conductor 36 (functional part) of the internal conductor 30 is provided inside the conductor-containing layer 20. Other constitutions are the same as in Example 1 and therefore not explained. As shown in FIG. 21B, an electronic component 810 in Variation Example 1 of Example 8 is such that the width (length in the X-axis direction) of the element body part 10 is longer than its length (length in the Y-axis direction). Other constitutions are the same as in Example 8 and therefore not explained.

Example 1 to Example 7 show cases where the high-hardness layer 22 was provided side by side with the conductor-containing layer 20 in the X-axis direction; instead, the high-hardness layer 22 may be provided side by side with the conductor-containing layer 20 in the Y-axis direction, as in Example 8 and Variation Example 1 of Example 8, so long as the high-hardness layer 22 is provided side by side with the conductor-containing layer 20 in a direction parallel with the bottom face 14 (mounting surface) of the element body part 10.

When an electronic component is mounted on a mounting board, stress tends to concentrate on the edges of the external electrodes 50 and the edges of the internal conductor 30, and therefore cracks tend to generate between these parts. Accordingly, the presence of the high-hardness layer 22 at these parts allows for suppression of crack generation. Also, in Variation Example 1 of Example 8, the mechanical strength of the element body part 10 is related to the length and width, not just the height, of the high-hardness layer 22. If the width of the electronic component is greater than its length, as in Variation Example 1 of Example 8, sufficient strength of the element body part 10 in the width direction can be ensured because the conductor-containing layer 20 and high-hardness layer 22 are provided side by side in the length direction of the element body part 10.

Figure 22A:
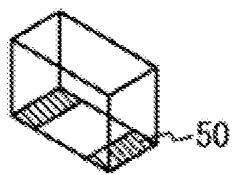
FIG. 22A to FIG. 22N are oblique perspective views showing other examples of external electrode shapes.
Figure 22B:
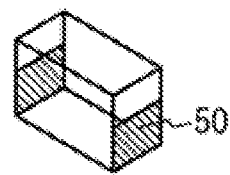
Figure 22C:
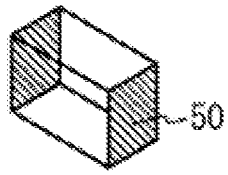
Figure 22D:
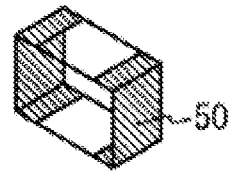
Figure 22E:
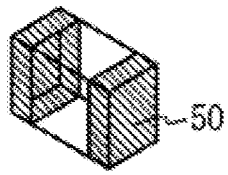
Figure 22F:
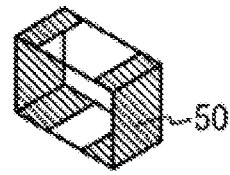
Figure 22G:
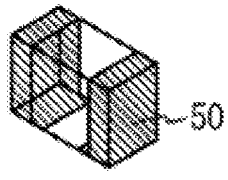
Figure 22H:
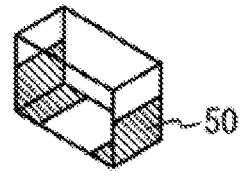
Figure 22I:
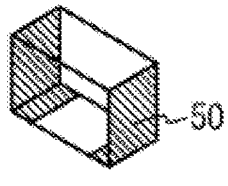
Figure 22J:
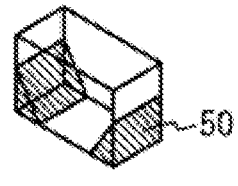
Figure 22K:
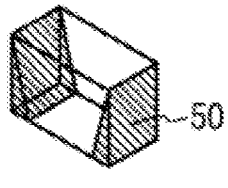
Figure 22L:
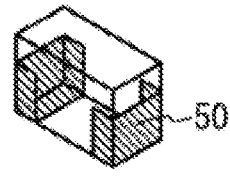
Figure 22M:
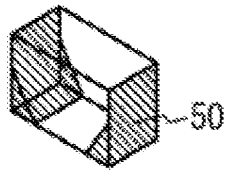
Figure 22N:
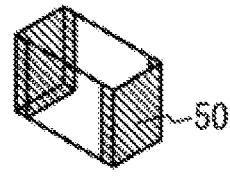

Example 1 to Example 8 show cases where the external electrodes 50 are L-shaped and extend from the bottom face 14, to the end faces 16, of the element body part 10, and they are also narrower than the width (width in the X-axis direction) of the element body part 10; however, the present invention is not limited to these examples. FIG. 22A to FIG. 22N are oblique perspective views showing other examples of external electrode shapes. The external electrodes 50 may be provided only on the bottom face, as shown in FIG. 22A, or they may be provided only on the bottom sides of the end faces, as shown in FIG. 22B, or they may be provided on the entire end faces, as shown in FIG. 22C. Or, they may be provided in a manner extending from the bottom face to the top face via the end faces, as shown in FIG. 22D, or they may extend further onto the side faces, as shown in FIG. 22E, or their length on the top face may be shorter than that on the bottom face, as shown in FIG. 22F and FIG. 22G. Or, they may be provided in a manner extending from the bottom face to parts of the end faces, as shown in FIG. 22H, or they may be provided in a manner extending from the bottom face to cover the entire end faces, as shown in FIG. 22I. Or, they may be provided in triangular shapes at the ends of the bottom face, as shown in FIG. 22J and FIG. 22K, or they may be provided in a manner covering parts of the bottom face, parts of the side faces, and parts of the end faces, as shown in FIG. 22L, or they may be provided in a manner covering parts of the bottom face, parts of the side faces, and the entire end faces, as shown in FIG. 22M and FIG. 22N. It should be noted that, even in the cases of FIG. 22A to FIG. 22N, the external electrodes 50 may still be narrower than the width of the element body part 10.

It should be noted that Example 1 shows a case where the electronic component was manufactured using electroplating, while Examples 4 and 5 show cases where the electronic component was manufactured by stacking sheets; however, the electronic component may be manufactured either by means of electroplating or stacking of sheets in any of Example 1 to Example 8. Also, the manufacturing method is not limited to the aforementioned methods and any method may be used, or any manufacturing method combining multiple methods may also be used, so long as it can achieve the structure of the present invention.

Example 9

Figure 23A:
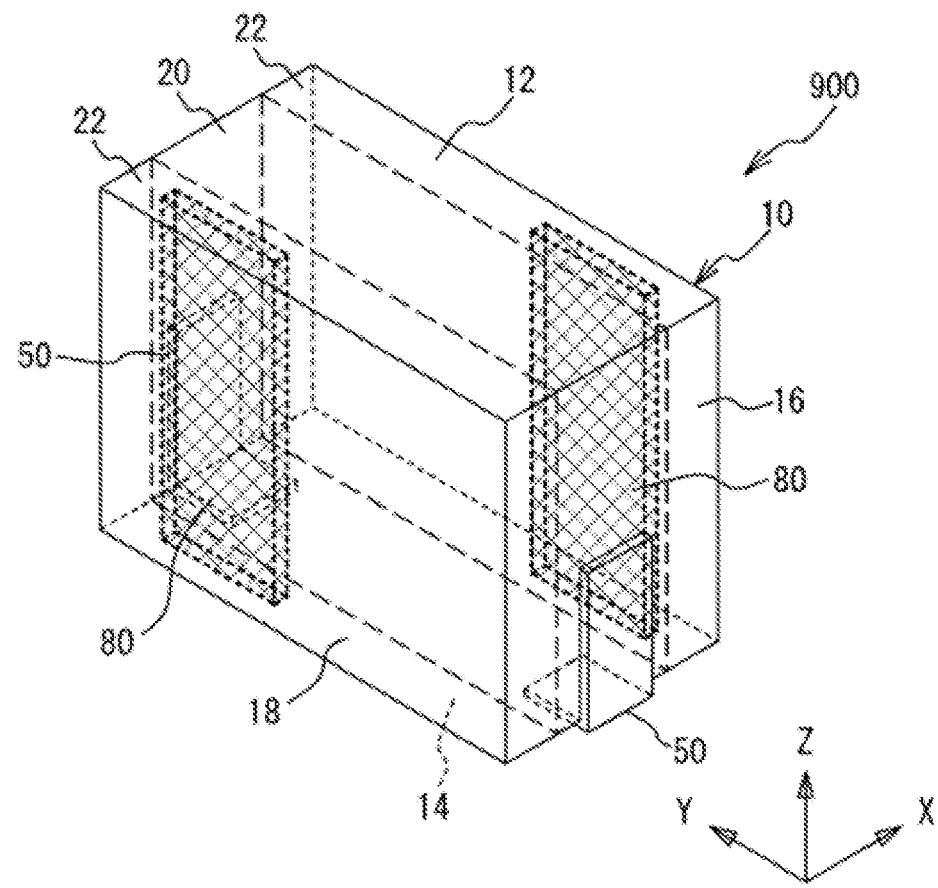
FIG. 23A is an oblique perspective view.
Figure 23B:
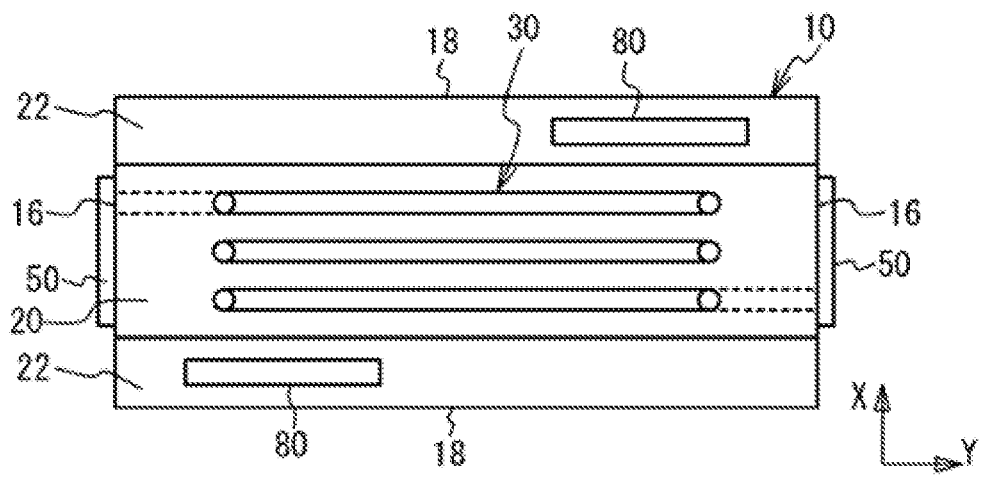
FIG. 23B is a top cross-sectional view, of the electronic component pertaining to Example 9.

FIG. 23A is an oblique perspective view, and FIG. 23B is a top cross-sectional view, of the electronic component pertaining to Example 9. It should be noted that, in FIG. 23A, the coil conductor 36, etc., are not illustrated for the sake of clarification of the figure (the same applies to FIG. 24A and FIG. 24B described later). As shown in FIG. 23A and FIG. 23B, an electronic component 900 in Example 9 is such that a marker part 80 is provided inside the element body part 10. For example, a marker part 80 is provided inside the high-hardness layer 22 and is different from the high-hardness layer 22 at least in one of the three attributes of color (hue, saturation, and brightness). In other words, the position of the marker part 80 can be identified. The marker part 80 may be formed using a material different from that of the high-hardness layer 22, or it may be formed using the same material as that of the high-hardness layer 22, and contains a pigment different in color from the high-hardness layer 22. In addition, the marker part 80 may have a higher hardness compared to the conductor-containing layer 20, just like the high-hardness layer 22 does. Other constitutions are the same as in Example 1 and therefore not explained.

According to Example 9, a marker part 80 is provided in the element body part 10. This way, the orientation of the electronic component 900 can be identified. Accordingly, the electronic components can be easily aligned in the production process and fewer problems occur as they are mounted on mounting boards.

Figure 24A:
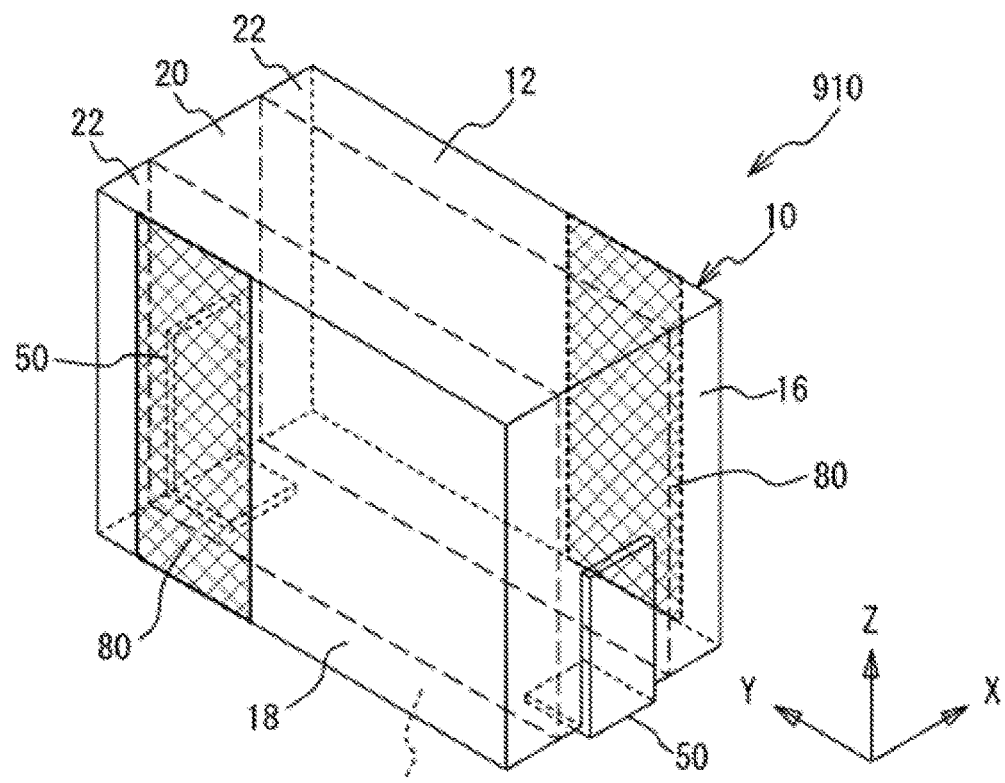
Figure 24B:
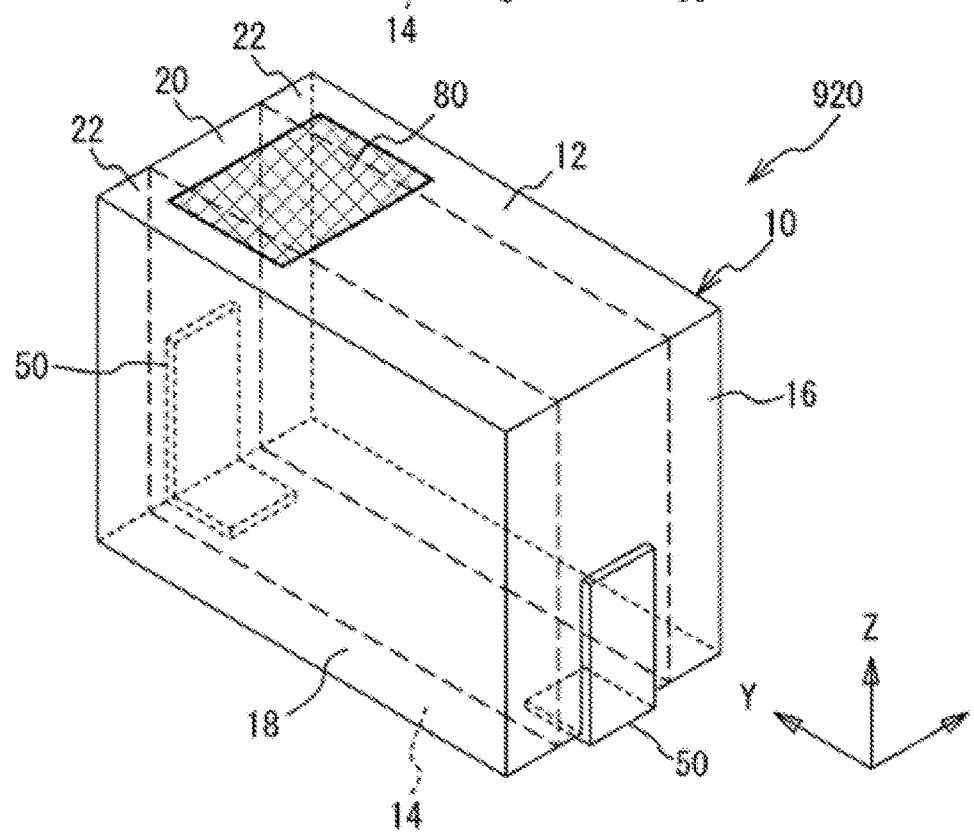
FIG. 24B is an oblique perspective view of the electronic component pertaining to Variation Example 2 of Example 9.

FIG. 24A is an oblique perspective view of the electronic component pertaining to Variation Example 1 of Example 9, while FIG. 24B is an oblique perspective view of the electronic component pertaining to Variation Example 2 of Example 9. As is the case of an electronic component 910 in Variation Example 1 of Example 9 shown in FIG. 24A, marker parts 80 may be provided on the side faces (specifically the surfaces of the high-hardness layers 22) of the element body part 10. Or, as is the case of an electronic component 920 in Variation Example 2 of Example 9 shown in FIG. 24B, a marker part 80 may be provided on the surface of the element body part 10 across the conductor-containing layer 20 and high-hardness layers 22. When the marker part 80 is provided across the conductor-containing layer 20 and high-hardness layers 22, preferably the marker part 80 is different from both the conductor-containing layer 20 and high-hardness layer 22 in at least one of the three attributes of color. It should be noted that, while FIG. 24B shows an example where the marker part 80 is provided on the top face 12 of the element body part 10, it may be provided on the bottom face 14 or an end face 16. The marker part 80 on the surface of the element body part 10 may be formed by means of printing, for example.

The foregoing described the examples of the present invention; however, the present invention is not limited to these specific examples and various variations/changes can be made so long as they are within the scope of the key points of the present invention as described in "What Is Claimed Is."

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. An electronic component, comprising:
   an element body part constituted by an insulative body of rectangular solid shape having six faces;
   an internal conductor embedded inside the element body part; and
   external electrodes electrically connected to the internal conductor;
   wherein the element body part has:
   among the six faces, at least one mountable face which is defined as any face on which the external electrodes are provided, wherein each mountable face constitutes a mounting surface of the element body part;
   a conductor-containing layer having a first hardness, in which a functional part, or part demonstrating electrical performance, of the internal conductor is embedded; and
   a high-hardness layer having a second hardness which is higher than the first hardness, wherein independently of which mountable face constitutes the mounting surface, the high-hardness layer is disposed on a lateral side of the conductor-containing layer,
   wherein a marker part indicative of which face is the mounting surface is planar and extends on a face of the high-hardness layer, other than the mounting surface, wherein the face of the high-hardness layer is an outer face adjoining the mounting surface on a lateral side of the high-hardness layer which is parallel to the lateral side of the conductor-containing layer, said marker part containing a pigment different in color from the high-hardness layer,
   wherein the marker part on the face of the high-hardness layer has a shape longer in a direction perpendicular to the mounting surface than in a direction parallel to the mounting surface.

2. An electronic component according to claim 1, wherein the high-hardness layer contains, by a higher percentage than the conductor-containing layer does, a filler made of at least metal oxide or silicon oxide.

3. An electronic component according to claim 1, wherein the element body part has the high-hardness layer in multiple areas, wherein the multiple high-hardness layers are provided in a manner sandwiching the conductor-containing layer.

4. An electronic component according to claim 1, wherein the conductor-containing layer is thicker than the high-hardness layer in a direction in which the conductor-containing layer and high-hardness layer are provided side by side.

5. An electronic component according to claim 1, wherein the internal conductor has a coil conductor as the functional part.

6. An electronic component according to claim 5, wherein the coil conductor is provided only in the conductor-containing layer, among the conductor-containing layer and the high-hardness layer.

7. An electronic component according to claim 5 wherein the conductor-containing layer has a dielectric constant lower than that of the high-hardness layer.

8. An electronic component according to claim 7, wherein the conductor-containing layer and high-hardness layer are each constituted by a material containing glass or resin, and a content by percentage of a silicon component in a material constituting the conductor-containing layer is higher than a content by percentage of a silicon component in a material constituting the high-hardness layer.

9. An electronic component according to claim 5, wherein the coil conductor has a coil axis running roughly in parallel with the mounting surface.

10. An electronic component according to claim 1, wherein the functional part is electrically connected to the external electrodes, via lead conductors, at the mounting surface, or at the end faces adjoining the mounting surface, of the element body part.

11. An electronic component according to claim 1, wherein a dimension, H, of the end faces measured in a direction perpendicular to the mounting surface, and a dimension, W, of the end faces measured in a direction parallel with the mounting surface, satisfies a relationship of $H>W$.

12. An electronic component according to claim 1, wherein the marker part has a higher hardness compared to the conductor-containing layer.

13. An electronic component according to claim 1, wherein
   the external electrodes consist of a pair of external electrodes, and
   the element body part has a second high-hardness layer having a second hardness which is higher than the first hardness, wherein independently of which mountable face constitutes the mounting surface, the high-hardness layer is disposed on a second lateral side of the conductor-containing layer opposite to the lateral side of the conductor-containing layer in a manner sandwiching the conductor-containing layer,
   wherein a second marker part indicative of which face is the mounting surface is planar and extends on a face of the second high-hardness layer, other than the mounting surface, wherein the face of the second high-hardness layer is an outer face adjoining the mounting surface on a lateral side of the second high-hardness layer which is parallel to the second lateral side of the conductor-containing layer, said second marker part containing a pigment different in color from the high-hardness layer.

* * * * *